United States Patent
Hayaishi et al.

(10) Patent No.: US 7,649,556 B2
(45) Date of Patent: Jan. 19, 2010

(54) SELECTION OF IMAGE DATA FOR OUTPUT

(75) Inventors: Ikuo Hayaishi, Nagano-ken (JP); Takahiko Koizumi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 839 days.

(21) Appl. No.: 10/665,679

(22) Filed: Sep. 19, 2003

(65) Prior Publication Data
US 2004/0119875 A1    Jun. 24, 2004

(30) Foreign Application Priority Data
Sep. 20, 2002   (JP) ............... 2002-274722

(51) Int. Cl.
*H04N 5/208*   (2006.01)
*H04N 5/225*   (2006.01)

(52) U.S. Cl. ............... 348/252; 348/207.2; 348/222.1; 348/231.3; 348/333.02; 348/364

(58) Field of Classification Search ........... 348/362, 348/169, 207.99, 222.1, 252, 364, 552; 382/266, 382/270, 272
See application file for complete search history.

(56) References Cited

U.S. PATENT DOCUMENTS

| | | | | |
|---|---|---|---|---|
| 6,094,217 A * | 7/2000 | Nishimura | ............ | 348/96 |
| 6,201,571 B1 * | 3/2001 | Ota | ............ | 348/239 |
| 6,392,759 B1 * | 5/2002 | Kuwata et al. | ............ | 358/1.9 |
| 6,535,636 B1 * | 3/2003 | Savakis et al. | ............ | 382/173 |
| 6,636,648 B2 * | 10/2003 | Loui et al. | ............ | 382/284 |
| 7,034,878 B2 * | 4/2006 | Matsushima | ............ | 348/333.03 |
| 7,043,059 B2 * | 5/2006 | Cheatle et al. | ............ | 382/112 |
| 7,277,126 B2 * | 10/2007 | Koizumi | ............ | 348/222.1 |
| 7,298,412 B2 * | 11/2007 | Sannoh et al. | ............ | 348/348 |
| 7,379,213 B2 * | 5/2008 | Koizumi | ............ | 358/3.27 |
| 2003/0068100 A1 * | 4/2003 | Covell et al. | ............ | 382/305 |
| 2003/0081249 A1 * | 5/2003 | Ahmad et al. | ............ | 358/1.15 |
| 2003/0095197 A1 * | 5/2003 | Wheeler et al. | ............ | 348/241 |
| 2003/0117511 A1 * | 6/2003 | Belz et al. | ............ | 348/333.11 |

FOREIGN PATENT DOCUMENTS

| | | |
|---|---|---|
| AU | 200071986 | 6/2001 |
| EP | 1137248 A2 * | 9/2001 |
| EP | 1 213 909 | 6/2002 |
| JP | 03-101571 | 4/1991 |
| JP | 06-178091 | 6/1994 |

(Continued)

OTHER PUBLICATIONS

M. Luxen and W. Förstner, "Characterizing Image Quality: Blind Estimation of the Point Spread Function from a Single Image," Proceedings of the PCV'02 Symposium, Graz, 2002, pp. A-205 ff. (XP-002264144).

(Continued)

*Primary Examiner*—Ngoc-Yen T Vu
(74) *Attorney, Agent, or Firm*—Martine Penilla & Gencarella, LLP

(57) ABSTRACT

At least either of image data and image generation record information is analyzed to determine an image quality parameter relating to image quality, and an output target decision regarding selection of image data as an output target is performed on the basis of the image quality parameter.

9 Claims, 26 Drawing Sheets average edge amount: large average edge amount: small

FOREIGN PATENT DOCUMENTS

| | | |
|---|---|---|
| JP | 09-069979 | 3/1997 |
| JP | 2000-209467 | 7/2000 |
| JP | 2000-224525 | 8/2000 |
| JP | 2001-128099 | 5/2001 |
| JP | 2002-010179 | 1/2002 |
| JP | 2002-187329 | 7/2002 |

OTHER PUBLICATIONS

Abstract of Japanese Patent Publication No. 2000-209467, Pub. Date: Jul. 28, 2000, Patent Abstracts of Japan.

A.C. Loui and A.E. Savakis, "Automatic Image Event Segmentation and Quality Screening for Albuming Applications," *Proc. IEEE Int'l Conf. Multimedia and Expo*, vol. 2, 2000, pp. 1125-1128 (XP-10513207A).

Abstract of Japanese Patent Publication No. 03-101571, Pub. Date: Apr. 26, 1991, Patent Abstracts of Japan.

Abstract of Japanese Patent Publication No. 06-178091, Pub. Date: Jun. 24, 1994, Patent Abstracts of Japan.

Abstract of Japanese Patent Publication No. 09-069979, Pub. Date: Mar. 11, 1997, Patent Abstracts of Japan.

Abstract of Japanese Patent Publication No. 2000-224525, Pub. Date: Aug. 11, 2000, Patent Abstracts of Japan.

Abstract of Japanese Patent Publication No. 2002-010179, Pub. Date: Jan. 11, 2002, Patent Abstracts of Japan.

Abstract of Japanese Patent Publication No. 2002-187329, Pub. Date: Jul. 2, 2002, Patent Abstracts of Japan.

Abstract of Japanese Patent Publication No. 2001-128099, Pub. Date: May 11, 2001, Patent Abstracts of Japan.

* cited by examiner

Fig.5

| Tag name | Parameter value |
|---|---|
| Aperture value | F8 |
| Exposure program | 3 |
| Exposure time | 1/125 (sec.) |
| Shutter speed | 7 (APEX) |
| Flash | • auto flash mode<br>• flash on<br>• reflected light sensor present<br>• reflected light sensed |
| Lens focal length (35 mm film basis) | 20.70 (mm) |
| Subject area | • center coordinates (640, 512)<br>• width (324)<br>• height (375) |

•
•
•
•

Embodiment 1 of Image Selection Based on
Sharpness Characteristic of an Image average edge amount: large average edge amount: small Eave: average edge amount Embodiment 2 of Image Selection Based
on Sharpness Characteristic of an Image weighted average
edge amount large weighted average
edge amount small Fig.17(a)
Fig.17(c)
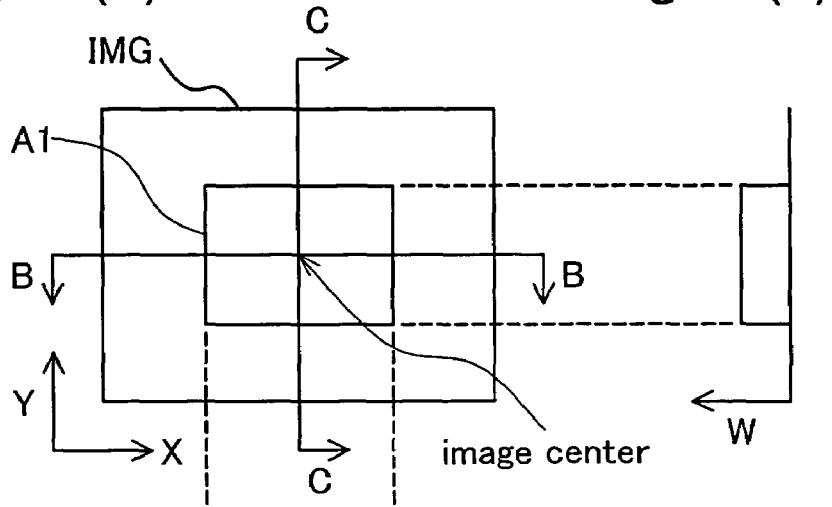
Fig.17(b)
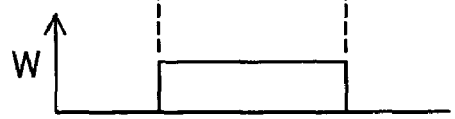
Fig.18(a)
Fig.18(c)
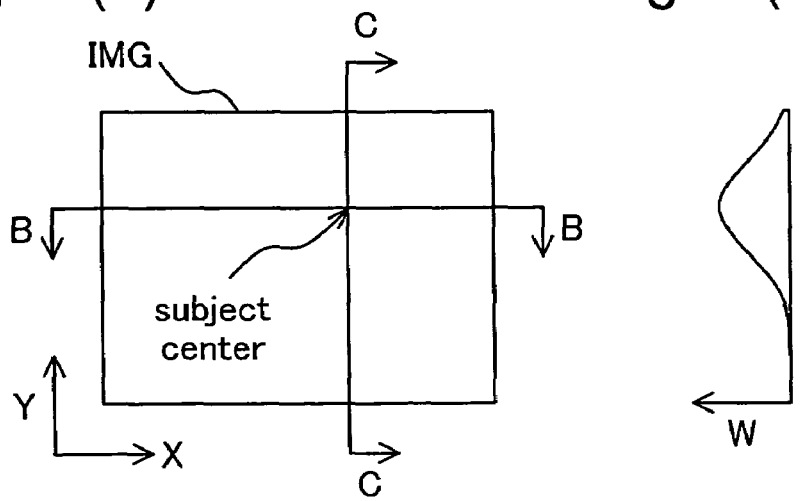
Fig.18(b)
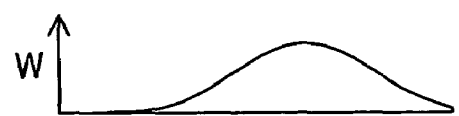

Embodiment 3 of Image Selection Based on Sharpness Characteristic of an Image
Fig.19(a)
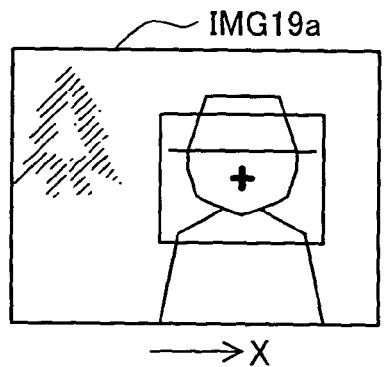
weighted average edge amount large
Fig.19(b)
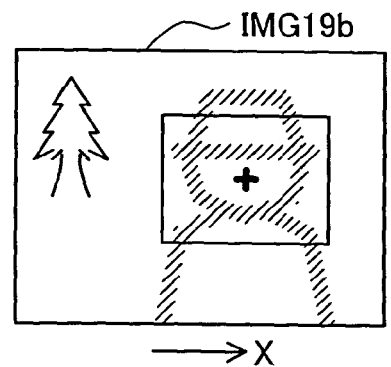
weighted average edge amount small
Fig.20(a)
Fig.20(c)
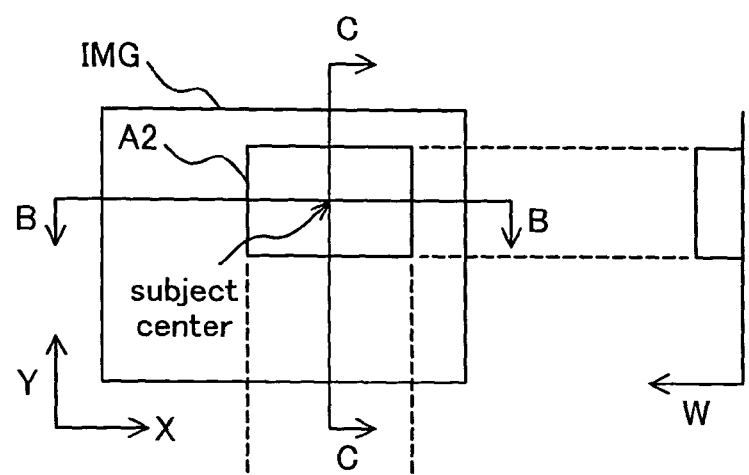
Fig.20(b)

Fig.21(a)
Fig.21(c)
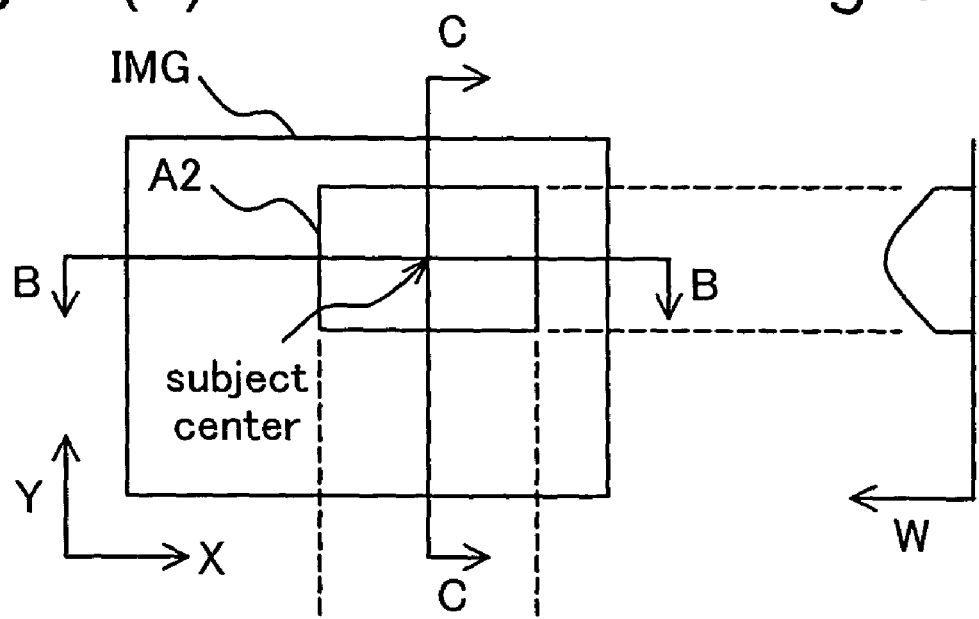
Fig.21(b)

Embodiment 4 of Image Selection Based on
Sharpness Characteristic of an Image

EWave: weighted average edge amount (calculated using W1)

Ewth: threshold value (calculated using W2)

Embodiment 1 of Image Selection Based on Brightness Characteristic of an Image
Fig.23(a)  Fig.23(b)  Fig.23(c)
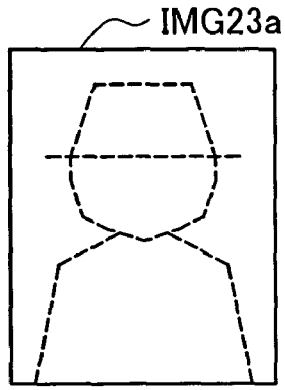
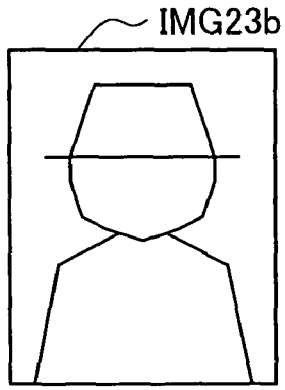
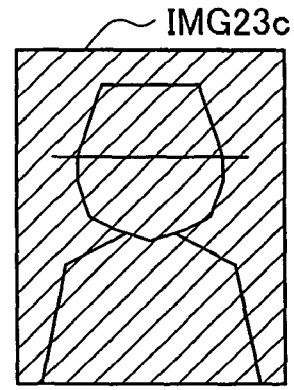
high brightness
large average brightness value
proper brightness
proper average brightness value
low brightness
small average brightness value
Fig.23(d)
Bave: average brightness value
Bth1: lower limit of proper range
Bth2: upper limit of proper range
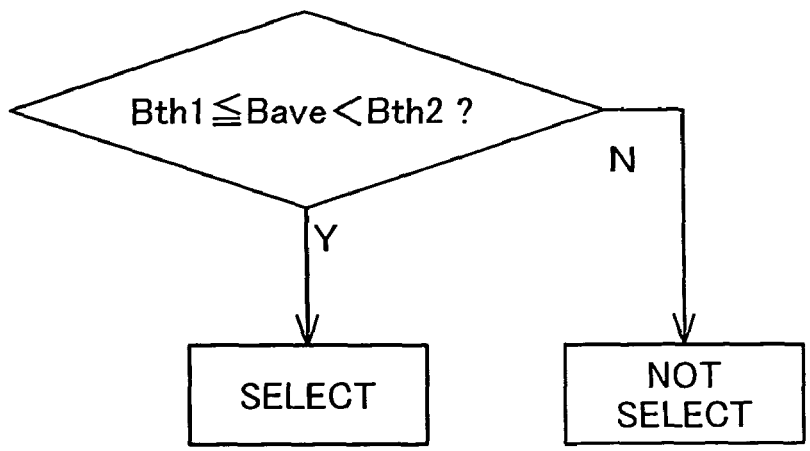

Embodiment 2 of Image Selection Based on Brightness Characteristic of an Image
Fig.24(a)  Fig.24(b)  Fig.24(c)
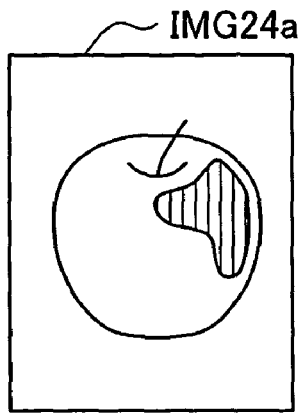
IMG24a
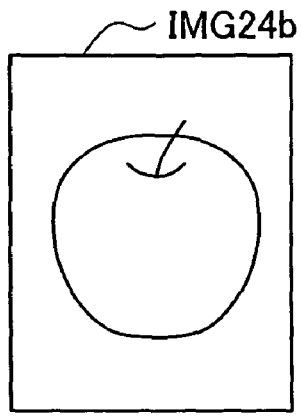
IMG24b
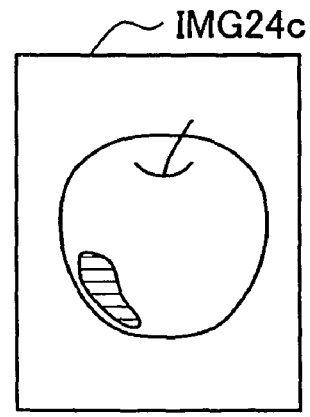
IMG24c
high brightness
large clipping pixel proportion
proper brightness
small clipping pixel proportion
low brightness
large clipping pixel proportion
Fig.24(d)
Crate: clipping pixel proportion
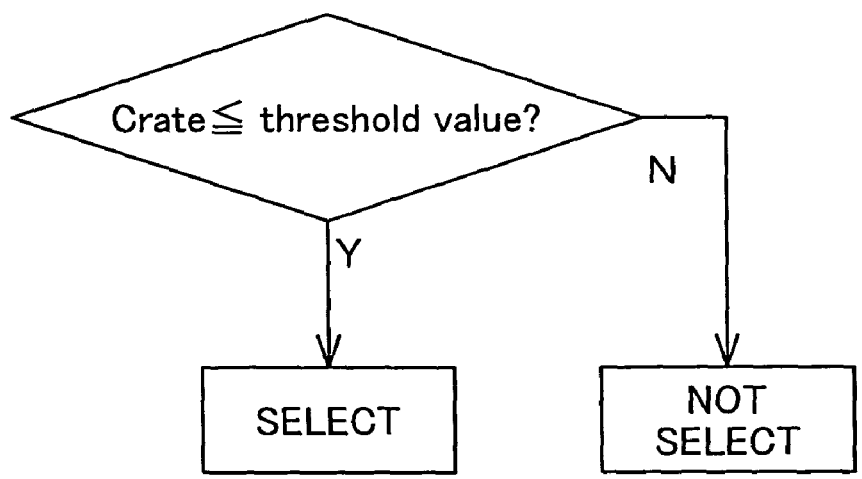

Embodiment 1 of Image Selection Based on Camera Shake Characteristic of an Image IMG25a short exposure time IMG25b long exposure time Et: exposure time Embodiment 2 of Image Selection Based on Camera Shake Characteristic of an Image long exposure time, manual setting long exposure time, automatic setting Et: exposure time Embodiment 3 of Image Selection Based on Camera Shake Characteristic of an Image long exposure time, flash on long exposure time, flash off Et: exposure time Embodiment 4 of Image Selection Based on
Camera Shake Characteristic of an Image short lens focal length long lens focal length Et: exposure time Etthd: threshold value
(set depending on lens focal length)

SELECTION OF IMAGE DATA FOR OUTPUT

BACKGROUND OF THE INVENTION

1. Field of the Invention

The present invention relates to an image data processing technique for executing image data output decisions.

2. Description of the Related Art

Image data generated by an image generating device is output from a suitable output device according to user preference. Known image output devices include CRTs, LCDs, printers, projectors, and television receivers; known image generating devices include digital still cameras (DSCs), and digital video cameras (DVCs).

Image data generated by an image generating device is sometimes generated under improper operating settings. Examples of such image data include image data focused on a subject other than the intended subject. Additional examples are cases of improper exposure resulting in an image that is too bright or too dark; and cases where camera shake caused by an unsteady hand during shooting results in a blurred image. These improper images are typically not desired to output. In such instances, it is typically necessary for the user, when outputting images from an output device, to select whether or not a particular image should be output; and this selection process is particularly arduous where a large number of images are being handled.

SUMMARY OF THE INVENTION

It is therefore an object of the present invention to carrying out automatically select suitable images for output.

In order to attain at least part of the aforementioned problem, there is provided an image output device for outputting an image using image data generated by an image generating device and image generation record information that is associated with the image data and that includes operation information for the image generating device at the time that the image data is generated. The image output device comprises an image data processing device and an output section. The image data processing device comprises an analyzer for analyzing at least one of the image data and the image generation record information, and for determining, on the basis of the image data, an image quality parameter relating to quality of an image; and a selector for performing, on the basis of the image quality parameter, a output target decision regarding whether to select each image data as an output target. The output section outputs an image using the image data that has been selected as the output target by the selector.

The image output device according to this invention performs appropriately selection of image data for output, on the basis of at least either image data or image generation record information.

This invention may be embodied in various ways, for example, an image output method and image output device; an image data processing method and image data processing device; a computer program for realizing the functions of such a method or device; and a storage medium having such a computer program stored thereon.

These and other objects, features, aspects, and advantages of the present invention will become more apparent from the following detailed description of the preferred embodiments with the accompanying drawings.

BRIEF DESCRIPTION OF THE DRAWINGS

FIG. 5 illustrates of an example of data structure in an Exif data field.

FIGS. 17(*a*)-17(*c*) illustrate another weight W distribution.

FIGS. 18(*a*)-18(*c*) illustrate still another weight W distribution.

FIGS. 19(*a*) and 19(*b*) illustrate a output target decision process in the third embodiment of image selection based on sharpness characteristics.

FIGS. 20(*a*)-20(*c*) illustrate another weight W distribution.

FIGS. 21(*a*)-21(*c*) illustrate still another weight W distribution.

FIGS. 23(*a*)-23(*d*) illustrate a output target decision process in the first embodiment of image selection based on brightness characteristics.

FIGS. 24(*a*)-24(*d*) illustrate a output target decision process in the second embodiment of image selection based on brightness characteristics.

DESCRIPTION OF THE PREFERRED EMBODIMENT

Figure 1:
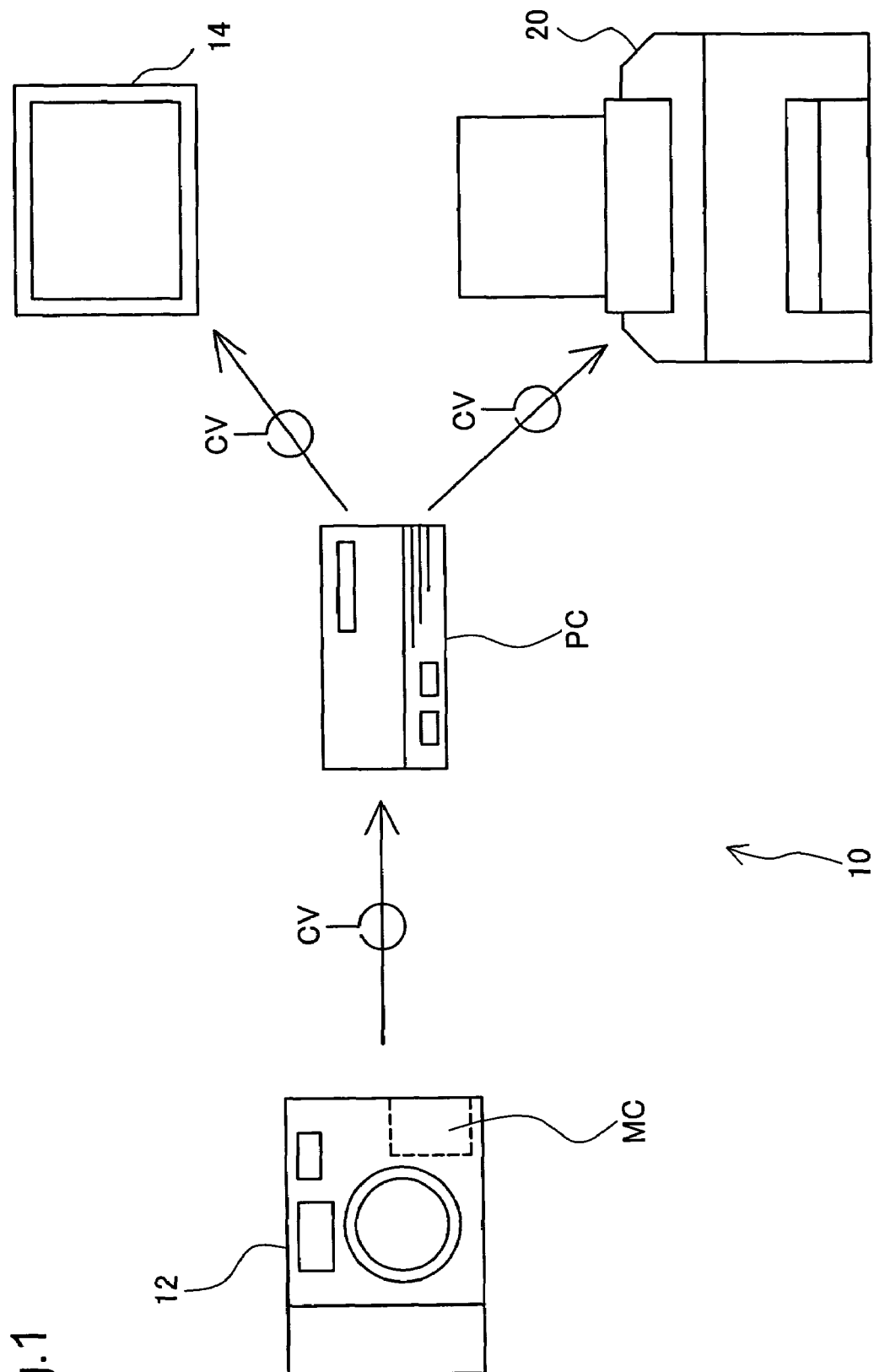
FIG. 1 illustrates an example of an image output system as an embodiment of the invention.

The embodiments of the present invention are described hereinbelow through certain specific preferred embodiments, in the following order.
- A. Arrangement of Image Output System
- B. Arrangement of Image File
- C. Arrangement of Image Data Processing Device
- D. Arrangement of Image Output Device
- E. Image Processing in Digital Still Camera
- F. Image Selection Based on Sharpness Characteristic of an Image
- G. Image Selection Based on Brightness Characteristic of an Image
- H. Image Selection Based on Camera Shake Characteristic of an Image
- I. Example Arrangement of Another Output Target Confirmation Process
- J. Example Arrangement of Another Image Output System
- K. Variant Examples A. Arrangement of Image Output System:

FIG. 1 is an illustration showing an example of an image output system in which an output device may be implemented, as an embodiment of the invention. Image output system 10 comprises a digital still camera 12 as an image generating device for generating image files; a computer PC as an image data processing device for executing output target decisions on the basis of image files; and a printer 20 as an image output device for outputting images. Image files generated by digital still camera 12 are transferred to computer PC via a cable CV, or by directly inserting into computer PC a memory card MC on which image files are stored. Computer PC executes an output target decision regarding the image data contained in the read out image file, and sends image data decided to be an output target to printer 20 via a cable CV. Printer 20 then outputs an image using the read out image data. As the image output device, a CRT display, LCD display, or other monitor 14, a projector, or the like could be used in addition to or instead of printer 20. The following description assumes direct insertion of a memory card MC into computer PC. The computer PC serving as the image data processing device and the printer serving as the image output device can together be termed an "output device", broadly defined.

Figure 2:
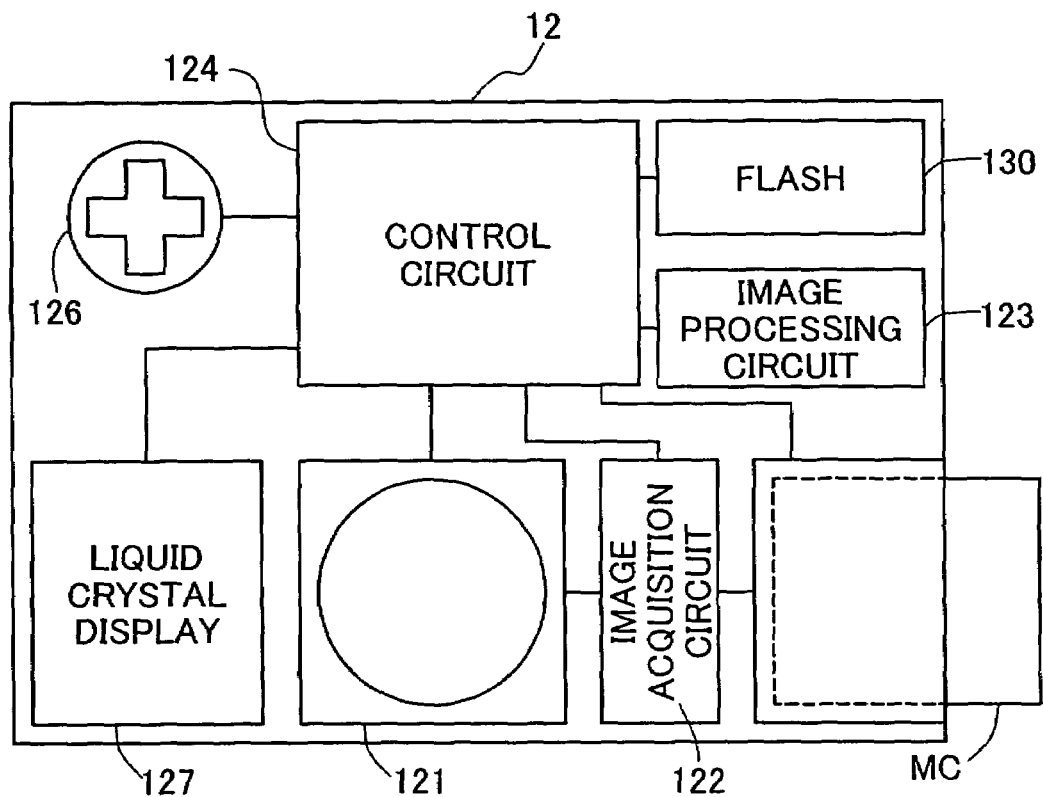
FIG. 2 is a block diagram showing a simplified arrangement of a digital still camera 12.

FIG. 2 is a block diagram showing a simplified arrangement of a digital still camera 12. The digital still camera 12 of this embodiment comprises an optical circuit 121 for collecting optical information; an image acquisition circuit 122 for controlling the optical circuit to acquire an image; an image processing circuit 123 for processing acquired digital images; a flash 130 serving as a supplemental light source; and a control circuit 124 for controlling the various circuits. Control circuit 124 comprises memory, not shown.

Digital still camera 12 stores acquired images on a memory card MC. The typical storage format of image data in digital still camera 12 is the JPEG format, but other storage formats, such as TIFF format, GIF format, BMP format, or RAW data format could be used.

Digital still camera 12 further comprises a Select/Set button 126 for setting various shooting parameters (e.g. aperture value, shutter speed, exposure adjustment mode, flash mode, subject area, shooting mode, etc.); and a liquid crystal display 127. Liquid crystal display 127 is used to preview photographed images, and when setting the aperture or other parameters using the Select/Set button 126.

Aperture value may be set to values within an available range according to the model of digital still camera 12; for example, it may be set to certain predetermined discrete numbers from 2 to 16 (e.g., 2, 2.8, 4, 5.6 ... etc.). F number is typically used for aperture value. Accordingly, a larger aperture value, or a larger F number, means a smaller aperture.

Exposure adjustment mode can be one selected from among a number of modes set in advance, for example, program auto mode (normal program mode), aperture priority mode, shutter speed priority mode, and manual mode. When set to program auto mode, aperture value and shutter speed are adjusted automatically to standard values, in order to set exposure to a standard value. When set to manual mode, user-set aperture value and shutter speed are used. An arrangement whereby, with aperture value and shutter speed set by the user, an exposure adjustment mode using those settings is selected automatically is also possible.

Flash mode is a parameter that controls operation of the flash 130, and can be one selected from among a number of modes set in advance, for example, auto flash mode, flash off mode, compulsory flash mode, etc.

Subject area is a shooting parameter that indicates the position of the subject in an image, and can be user-set by setting coordinates in the image. By additionally setting a circle or rectangle of a desired size centered on the set coordinates, the position and size of the subject within the image can be indicated.

Shooting mode or scene mode can be selected from among a number of predetermined modes such as standard mode, portrait mode, landscape mode, and night scene mode. Where one of these shooting modes has been selected, related parameters (shutter speed, flash mode, etc.) are set automatically depending on the selected mode. For example, where standard mode has been selected as the shooting mode, parameters relating to image generation are set to standard values.

When a photograph has been taken with a digital still camera 12, image data and image generation record information are stored as an image file in memory card MC. Image generation record information can include shutter speed and other parameter settings at the time of shooting (time of generation of image data) as described later in detail.

Figure 3:
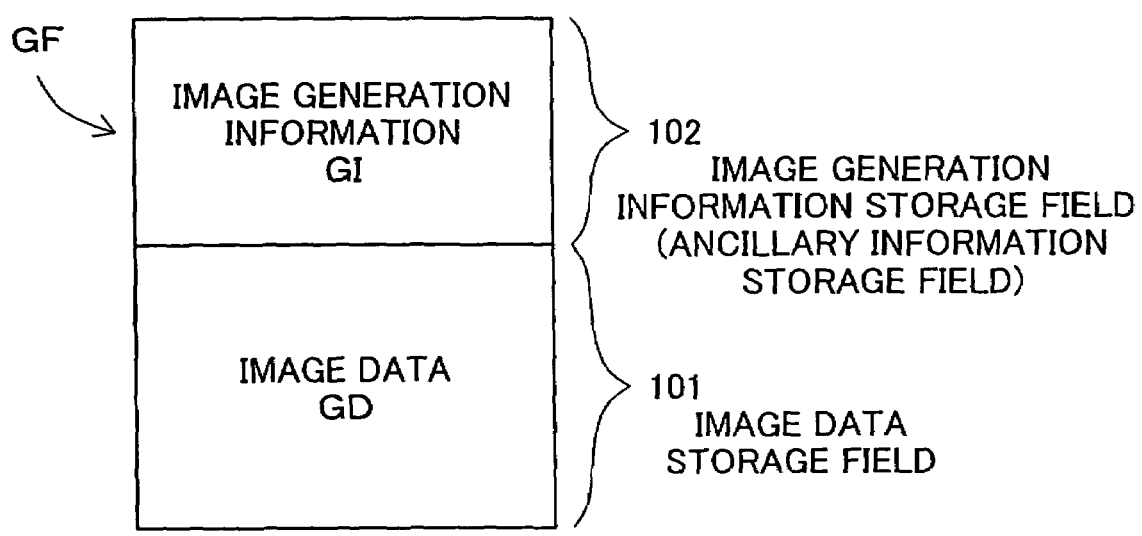
FIG. 3 is a conceptual illustration of an example of an arrangement within an image file.

B. Arrangement of Image File:

FIG. 3 is a conceptual illustration of an example of an arrangement within an image file that can be used in this embodiment. Image file GF comprises an image data storage field 101 for storing image data GD; and an image generation record information storage field 102 for storing image generation record information GI. Image data GD is stored, for example, in JPEG format, while image generation record information GI is stored, for example, in TIFF format (a format in which data and data fields are specified using tags). The terms file structure and data structure in this embodiment refer to file or data structure in the form in which a file or data etc. is stored in a memory device.

Image generation record information GI is information relating to an image when image data is generated (shot) by digital still camera 12 or other such image generating device, and includes the following settings.
- aperture value
- exposure time
- shutter speed
- lens focal length (converted to 35 mm film basis)
- flash (Flash On/Off)
- subject area
- exposure adjustment mode shooting mode (scene mode)

maker name model name gamma value

The image file GF in this embodiment may basically comprise the aforementioned image data storage field 101 and image generation record information storage field 102; or may have a file structure according to an existing standardized file format. The following specific description pertains to the case where the image file GF pertaining to this embodiment conforms to the Exif file format.

An Exif file has a file structure in accordance with the digital still camera image file format specification (Exif); the specification has been proposed by the Japan Electronics and Information Technology Industries Association (JEITA). Similar to the conceptual diagram in FIG. 3, the Exif file format comprises a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the image generation record information storage field 102. The ancillary information storage field stores image generation record information relating to a JPEG image, such as shooting date/time, shutter speed, and subject area.

Figure 4:
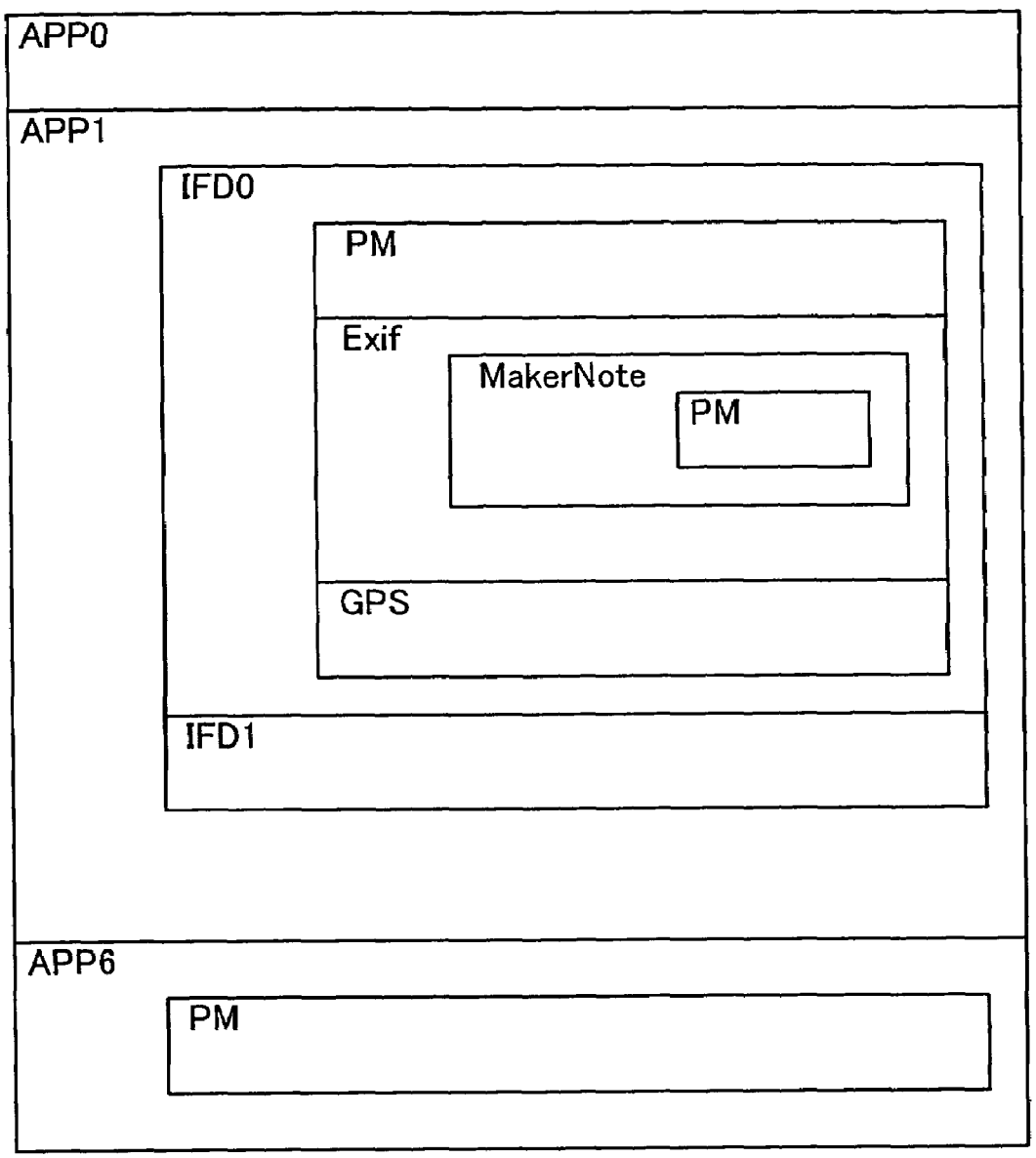
FIG. 4 illustrates an example of data structure of an ancillary information storage field 103.

FIG. 4 illustrates an example of data structure of ancillary information storage field 103. In the Exif file format, hierarchical tags are used to designate data fields. Each data field can contain a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are contained. The APP1 data field contains within it two data fields whose tag names are IFD0 and IFD1. The IFD0 data field contains three data fields whose tag names are PM, Exif, and GPS. Data and data fields are stored according to a prescribed address or offset value; address or offset value can be searched by means of tag name. On the output device end, data corresponding to desired information can be acquired by means of specifying an address or offset value corresponding to the desired information.

FIG. 5 illustrates an example of data structure (data tag names and parameter values) in the Exif data field in FIG. 4, wherein tag name can be referenced by tracing in the order APP1-IFD0-Exif. As shown in FIG. 4, the Exif data field can include a data field whose tag name is MakerNote; the MakerNote data field can in turn include a plurality of items of data, although these are omitted in FIG. 5.

As shown in FIG. 5, the Exif data field stores parameter values relating to information such as aperture value, exposure program, exposure time, shutter speed, flash, lens focal length (converted to 35 mm film basis), and subject area.

Aperture value is information relating to the aperture value at the time of image generation; F number is used as the aperture value in this embodiment. Accordingly, a larger aperture value or a larger F number means smaller aperture.

Exposure program is information that identifies an exposure adjustment mode, can be selected from among a number of values including the following four values, for example.

Parameter value 1: manual mode

Parameter value 2: normal program mode

Parameter value 3: aperture priority mode

Parameter value 4: shutter speed priority mode

Exposure time is information relating to the time interval for which the image generating device receives light during generation of an image; the parameter value records the exposure time in units of seconds.

Shutter speed is information relating to the shutter speed value at the time of image generation; the parameter value records shutter speed in APEX units. Shutter speed and exposure time each signify a time interval for which the image generating device receives light during generation of an image, and are basically the same value converted to different units.

Flash information is information relating to operation of the flash, and can be used to decide whether illumination has been provided by a supplemental light source. The parameter value having the tag name Flash can include four sets of information relating to operating modes and operation result thereof. Operating mode may be set from among a plurality of values including the following three values, for example.

1: compulsory flash mode

2: flash off mode

3: auto flash mode

Operation result may be set from among two values, Flash on or Flash off, for example. The decision as to whether or not there was illumination by the supplemental light source during generation of image data may be carried out using this operation result.

Among image generating devices, certain devices are equipped with a mechanism for sensing reflected light from a subject illuminated with light from a flash. In the event that a flash cover or other obstacle blocks the flash light, or the flash does not fire despite being operated, no light illuminates the subject. Such instances can be identified through the presence or absence of reflected light. Flash information can include information relating to the presence/absence of a reflected light sensing mechanism, and to the presence/absence of reflected light sensed at the time of shooting. In the event that a reflected light sensing mechanism is present and sensed reflected light is absent, it can be decided that no illumination has been provided by the supplemental light source, even if the aforementioned operation result is Flash on.

Lens focal length (converted to 35 mm film basis) is information relating to the distance between the center of the lens and its focal point, i.e., film or photoreceptor element such as a CCD; the parameter value records the distance in mm units. This parameter value is a value obtained by converting actual lens focal length to lens focal length in a camera that uses 35 mm, under conditions that maintain the ratio of photoreceptor element size to lens focal length.

Subject area is information indicating the position of a subject in an image, and center coordinates of the subject area are set as the parameter value. Where a circular or rectangular area is set to indicate the size of the subject, the radius of the circle or width of the rectangle can be set in association therewith.

Information associated with image data is also stored appropriately in fields other than the Exif data field in FIG. 4. For example, maker name and model name are stored in the data field whose tag name is IFD0, as information identifying the image generating device.

Figure 6:
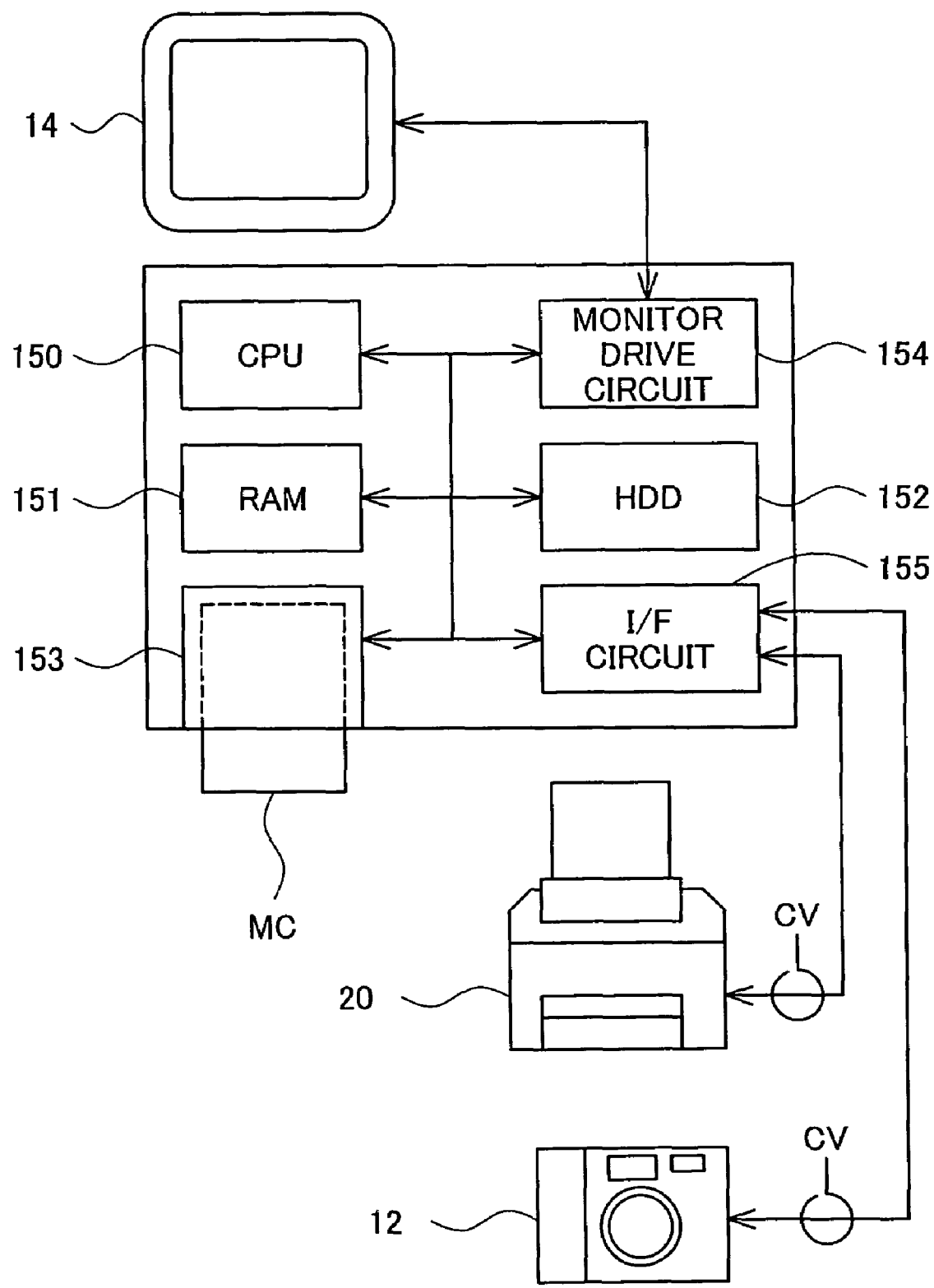
FIG. 6 is a block diagram showing a simplified arrangement of a computer PC.

C. Arrangement of Image Data Processing Device:

FIG. 6 is a block diagram showing a simplified arrangement of the computer PC in this embodiment. Computer PC comprises a CPU 150 for executing image data processing; RAM 151 for temporarily storing results of operations by CPU 150, image data, and the like; and a hard disk drive (HDD) 152 for storing data needed for image data processing, such as an output target decision program. Computer PC further comprises a memory card slot 153 for installing a memory card MC, and for acquiring data from memory card MC; a monitor drive circuit 154 for driving a monitor 14; and an I/F circuit 155 for interface with printer 20, and digital still camera 12. I/F circuit 155 incorporates interface circuits designed in consideration of ease of connection to printer 20 and digital still camera 12. Parallel interface circuits, and universal serial bus interface circuits may be used as such interface circuits.

An image file GF generated by a digital still camera 12 is supplied to computer PC via a cable or via a memory card MC. When an image data processing application program, either an image retouching application or a printer driver, is started up by a user operation, CPU 150 analyzes the image file GF and executes image data processing to perform an output target decision. That is, CPU 150, RAM 151, and HDD 152 function as an analyzer and selector. The image data processing application program may be set up to run automatically when a memory card MC is inserted into memory card slot 153, or when connection of a digital still camera 12 to I/F circuit 155 via a cable is detected. The specifics of image data processing executed by CPU 150 are described later in detail.

Image data selected as an output target by CPU 150 is transferred to an image output device, for example, printer 20, whereupon the image output device receiving the image data executes image output.

Figure 7:
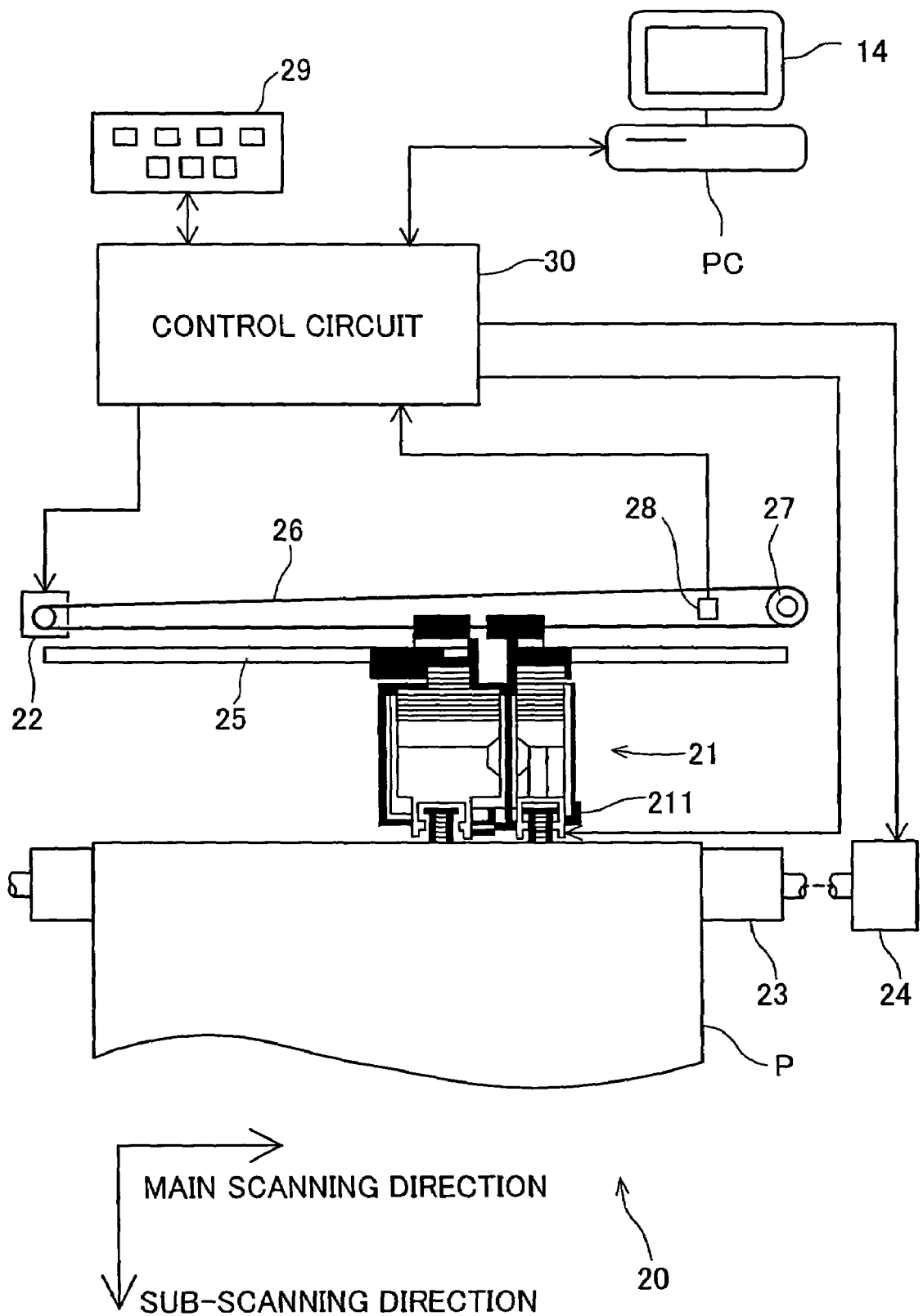
FIG. 7 is a block diagram showing a simplified arrangement of a printer 20.

D. Arrangement of Image Output Device:

FIG. 7 is a block diagram showing a simplified arrangement of printer 20 in the present embodiment. Printer 20 is, for example, an ink jet printer that ejects ink of four colors, cyan C, magenta M, yellow Y, and black K, on a print medium to reproduce an color image. An electro-photographic printer that transfers and fixes toner onto a print medium may also be used. In addition to the four colors indicated above, light cyan LC which is lighter in density than cyan C, light magenta LM which is lighter in density than magenta Mg, dark yellow DY which is darker in density than yellow Y may be used as ink. Where monochromatic printing is performed, the arrangement may instead employ black K only; or red R or green G may be additionally used. The type of ink or toner used can be selected depending on the characteristics of the image for output.

Printer 20 comprises a mechanism for driving a print head 211 mounted on a carriage 21, to eject ink and form dots; a mechanism for reciprocating carriage 21 in the axial direction of a platen 23 by means of a carriage motor 22; a mechanism for feeding printer paper P by means of a paper feed motor 24; and a control circuit 30. The mechanism for reciprocating carriage 21 in the axial direction of a platen 23 is composed of a slide rail 25 extending parallel to the axis of platen 23, for slidably retaining carriage 21; a pulley 27 coupled via an endless drive belt 26 to a carriage motor 22; and a position sensor 28 for sensing the home position of carriage 21. The mechanism for feeding printer paper P is composed of platen 23; paper feed motor 24 which rotates platen 23; an auxiliary paper feed roller, not shown in the drawing; and a gear train (not shown) for transmitting rotation of paper feed motor 24 to platen 23 and the auxiliary paper feed roller.

Control circuit 30 exchanges signals with a printer control panel 29 while appropriately controlling operation of paper feed motor 24, carriage motor 22, and print head 211. Printer paper P supplied to printer 20 is set pinched between platen 23 and the auxiliary paper feed roller, and advanced by a predetermined amount through the rotation of platen 23.

Carriage 21 has a print head 211, and is designed for installation of an ink jet cartridge of utilizable ink. On the bottom face of print head 211 are disposed nozzles for ejecting utilizable ink (not shown).

Figure 8:
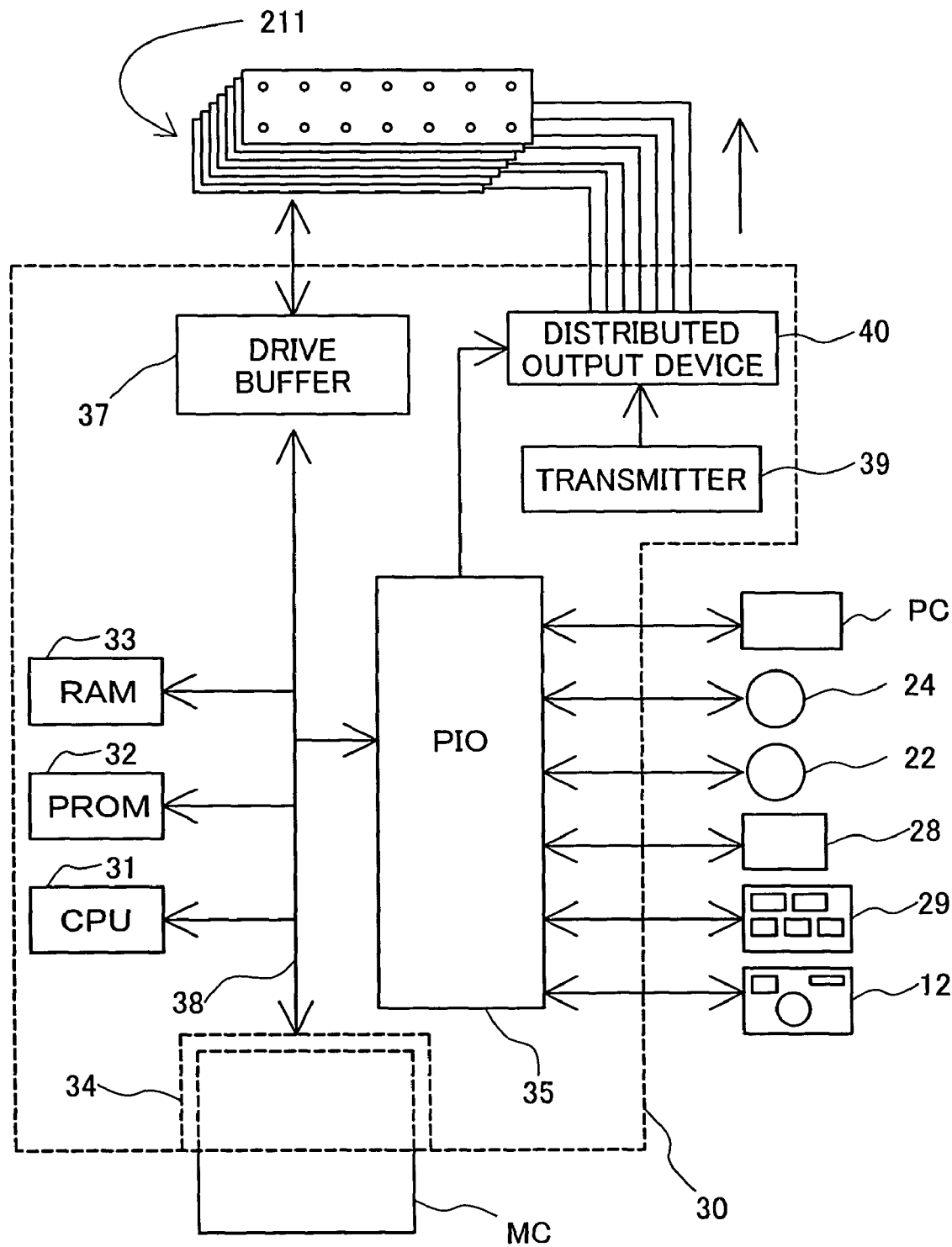
FIG. 8 is a block diagram showing an arrangement of printer 20, centered on the control circuit 30.

FIG. 8 is a block diagram showing an arrangement of printer 20 including the control circuit 30. Within control circuit 30 are disposed a CPU 31, PROM 32, RAM 33, a memory card slot 34 for a memory card MC, a peripheral device input/output section (PIO) 35 for exchanging data with paper feed motor 24, carriage motor 22, and a drive buffer 37. Drive buffer 37 is used as a buffer for supplying dot on/off signals to print head 211. These components are interconnected by a bus 38, enabling exchange of data among them. Control circuit 30 is also provided with a transmitter 39 for outputting a drive waveform at predetermined frequency, and a distributed output device 40 for distributing the output of transmitter 39 to print head 211 at predetermined timing.

CPU 31 analyzes print data supplied from computer PC, acquires dot data, and while synchronizing with operation of paper feed motor 24 and carriage motor 22, outputs the dot data to drive buffer 37 at predetermined timing. An image based on the print data is output as a result.

Figure 9:
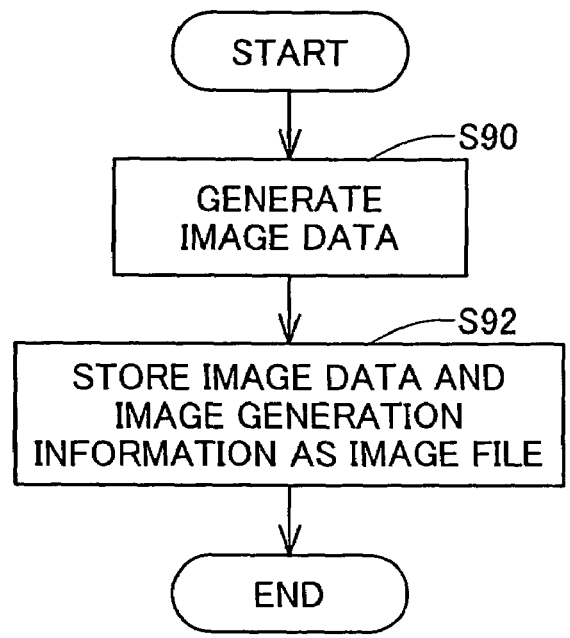
FIG. 9 is a flowchart showing flow of an image file GF generation process.

E. Image Processing in Digital Still Camera:

FIG. 9 is a flowchart showing a process flow for generating an image file GF in digital still camera 12.

Control circuit 124 (FIG. 2) of digital still camera 12 generates image data GD in response to a shoot request, for example, depression of a shutter button (Step S90). Where shutter speed, shooting mode and other parameter settings have been made, image data GD is generated using the set parameter values.

Control circuit 124 stores the generated image data GD and image generation record information GI as an image file GF on memory card MC (Step S92), and terminates the processing routine. Image generation record information GI includes parameters used at the time of image generation, such as shutter speed, exposure time, shooting mode, and other arbitrarily set parameter values, and parameter values set automatically, such as maker name, and model name. Image data GD also stores as image file GF [image information] that has been converted from the RGB color space to the YCbCr color space, and compressed in JPEG format.

By means of the aforementioned processes executed in digital still camera 12, both image data GD and image generation record information GI that includes various parameter values at the time of generation of image data is set in the image file GF stored on memory card MC.

Figure 10:
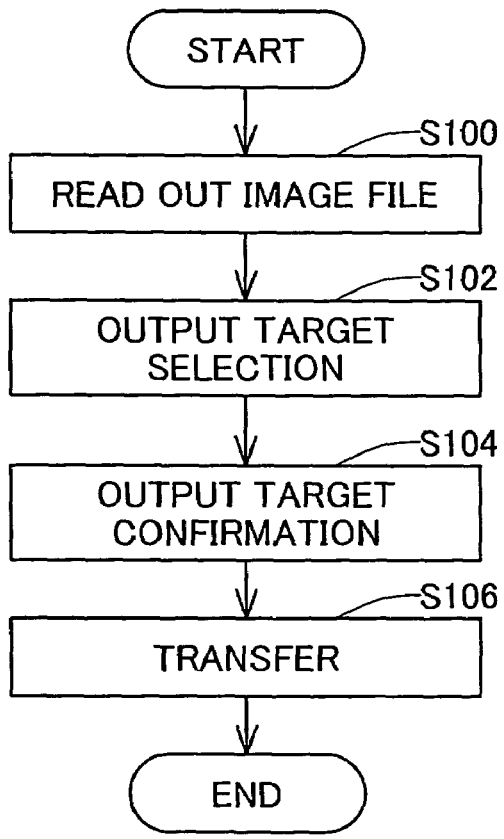
FIG. 10 is a flow chart showing flow of image data processing.

F. Image Selection Based on Sharpness Characteristic of an Image:

F1. Embodiment 1 of Image Selection Based on Sharpness Characteristic of an Image:

FIG. 10 is a flow chart showing a process flow of image data processing executed in the image data processing device of this embodiment. When a memory card MC including an image file GF has been inserted into memory card slot 153, CPU 150 (FIG. 6) of computer PC, which is the image data processing device, reads out the image file GF (FIG. 3) from memory card MC (Step S100). Next, in Step S102, CPU 150 executes a process to select one or more images as output target, and next in Step S104, executes a process for permitting user confirmation of the output target images selected in Step S102. These two steps (S102, S104) will be described later in detail. Next, in Step S106, CPU 150 outputs the output target images to an image output device, and terminates the processing routine.

Figure 11:
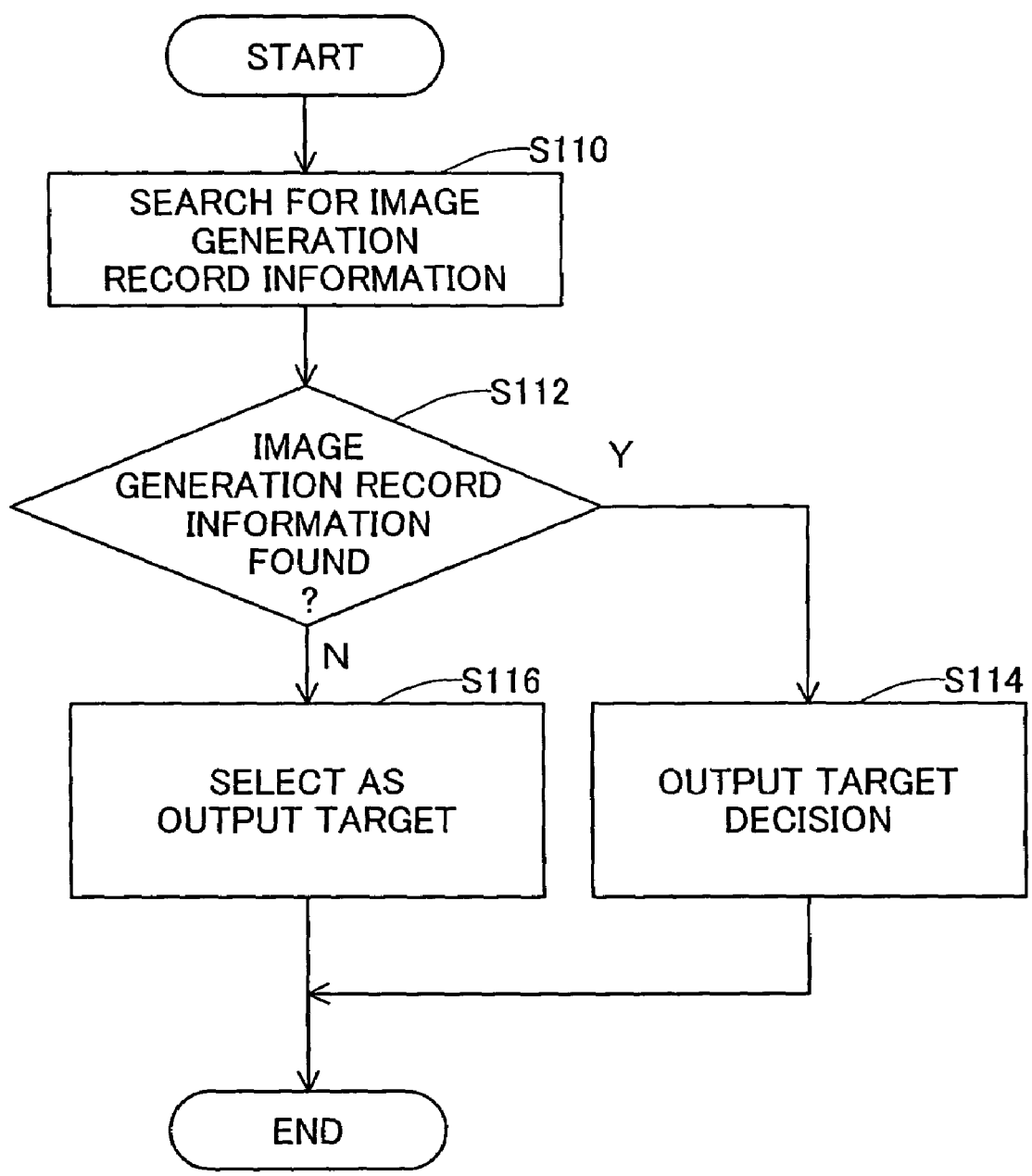
FIG. 11 is as flow chart showing a processing routine in a output target selection process.

FIG. 11 is a flow chart showing a processing routine for one image file in the output target selection process (corresponding to Step S102 in FIG. 10). In Step S110, CPU 150 (FIG. 6) of computer PC searches the ancillary information storage field of image file GF for image generation record information GI indicating information at the time the image data was generated. In the event that image generation record information GI is found (Step S112: Y), CPU 150 acquires the image generation record information GI, and using the image generation record information GI, executes an output target decision process, described later, records the decision result in RAM 151 (Step S114), and terminates the processing routine.

An image file created by a drawing application or the like, on the other hand, will not contain image generation record information GI having information such as shutter speed. If CPU 150 cannot find image generation record information GI (Step S112: N), it records in RAM 151 a decision result designating the image file as an output target (Step S116), and terminates the processing routine.

Where a plurality of image files are present, for example, if a memory card contains a plurality of image files, CPU 150 executes the process of FIG. 11 on each image file. As a result, output target decision results for all image files are recorded in RAM 151. The flow of the processes of FIGS. 9-11 is the same in the other embodiments described hereinafter.

Figure 12A:
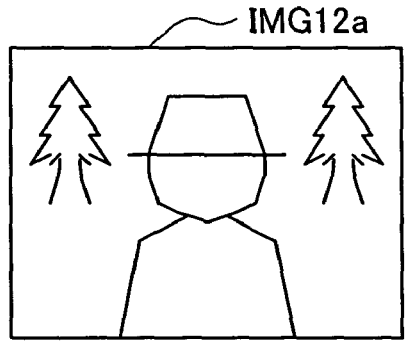
FIGS. 12(*a*)-12(*c*) illustrate an output target decision process in the first embodiment of image selection based on sharpness characteristics.
Figure 12B:
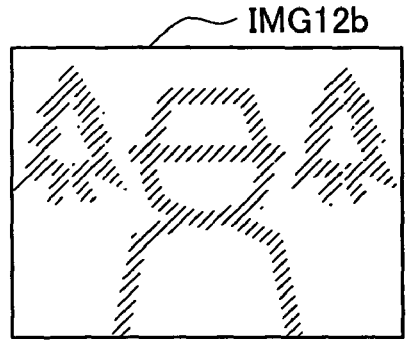
Figure 12C:
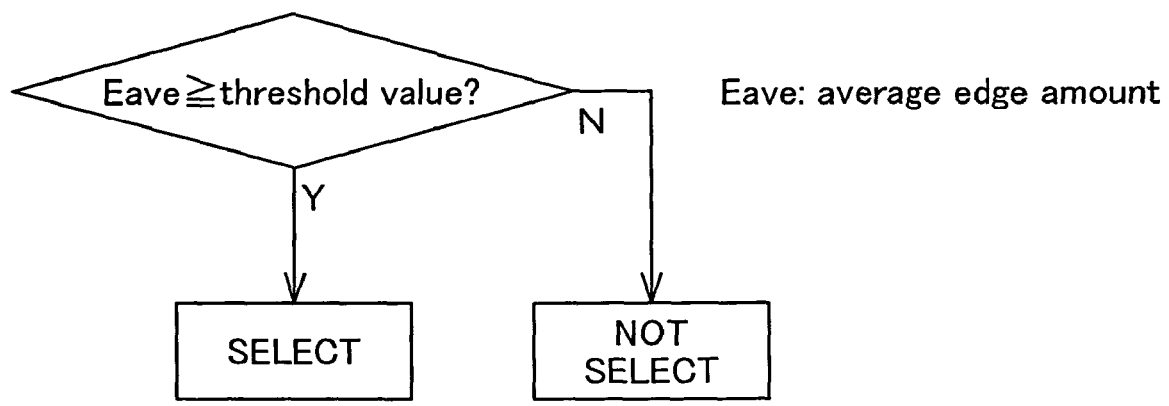

FIGS. 12(a)-12(c) illustrate the output target decision process of this embodiment. Image IMG12a shown in FIG. 12(a) contains a human figure in the center, and trees in the background. Image IMG12b shown in FIG. 12(b) captures the same subject as image IMG12a, but differs from image IMG12a in that the contours are blurred. Such blur may occur, for example, where the camera is out of focus when the image data is generated, or in the case of camera shake. In output target decision process of this embodiment, CPU 150 (FIG. 6) selects, as output targets, images in which contours are sharp, as with image IMG12a, while excluding from output targets images in which contours are blurred and unsharp, as with image IMG12b. In order to make this decision, CPU 150 analyzes image data; uses edge amount to determine a sharpness characteristic value relating to sharpness in an image as an image quality parameter value; and makes a decision on the basis of this sharpness characteristic value.

Figure 13:
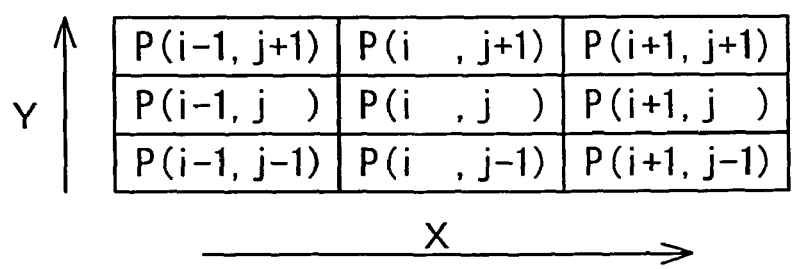
FIG. 13 illustrates an example of a pixel array.

The sharpness characteristic value may be obtained, for example, as an average edge amount value in the image. Edge amount is the magnitude of variation in the brightness value. The difference in brightness value from pixels in proximity to a certain pixel location may be employed as the edge amount for the pixel location. This difference can be calculated by a number of different methods, for example, using the Prewitt operator. As shown in FIG. 13, a plurality of pixels are arranged in an X axis direction and in a Y axis direction, with P(i, j) representing the brightness value of the pixel at the i-th position along the X axis and the j-th position along the Y axis. Here, the arithmetic expression for edge amount E(i, j) at pixel position (j, j) by the Prewitt operator is represented by the following arithmetic expression.

$$E(i, j) = \sqrt{\Delta fx^2 + \Delta fy^2}$$
$$\Delta fx = \{P(i+1, j+1) - P(i-1, j+1)\} +$$
$$\{P(i+1, j) - P(i-1, j)\} +$$
$$\{P(i+1, j-1) - P(i-1, j-1)\}$$
$$\Delta fy = \{P(i-1, j-1) - P(i-1, j+1)\} +$$
$$\{P(i, j-1) - P(i, j+1)\} +$$
$$\{P(i+1, j-1) - P(i+1, j+1)\}$$

Where image data is expressed in a color space that does not include brightness value as a parameter, for example, where represented by an RGB color space, brightness values at pixel positions can be obtained by first converting it to a color space that includes brightness value as a parameter, for example, an HSL color space, and YCbCr color space.

FIG. 12(c) shows the output target decision process of this embodiment. In this embodiment, image data whose average edge amount Eave, as calculated using the above arithmetic expression, is equal to or greater than a predetermined threshold value is selected as an output target. Image data whose average edge amount Eave is less than the predetermined threshold value is excluded from an output target. In a sharp image having distinct contours, since the contours of the subject in the image are distinct, pixels having large edge amount tend to be more numerous. On the other hand, in an unsharp image having blurred contours, since the contours of the subject in the image are blurred, pixels having small edge amount tend to be more numerous. That is, in a sharp image, average edge amount Eave tends to be large, whereas in a blurred image average edge amount Eave tends to be small. Thus, by selecting as output targets images whose average edge amount Eave is equal to or greater than a threshold value, blurred images can be excluded from output targets. As a threshold value of this kind, there could be used a value determined on the basis of sensory test of image output results. For example, where the possible range for brightness value is 0-255, a threshold value of 20 could be used. It should be noted that, in this embodiment, the image quality parameter value (average edge amount) is determined by means of analysis of the image data only, without utilizing image generation record information.

Figure 14:
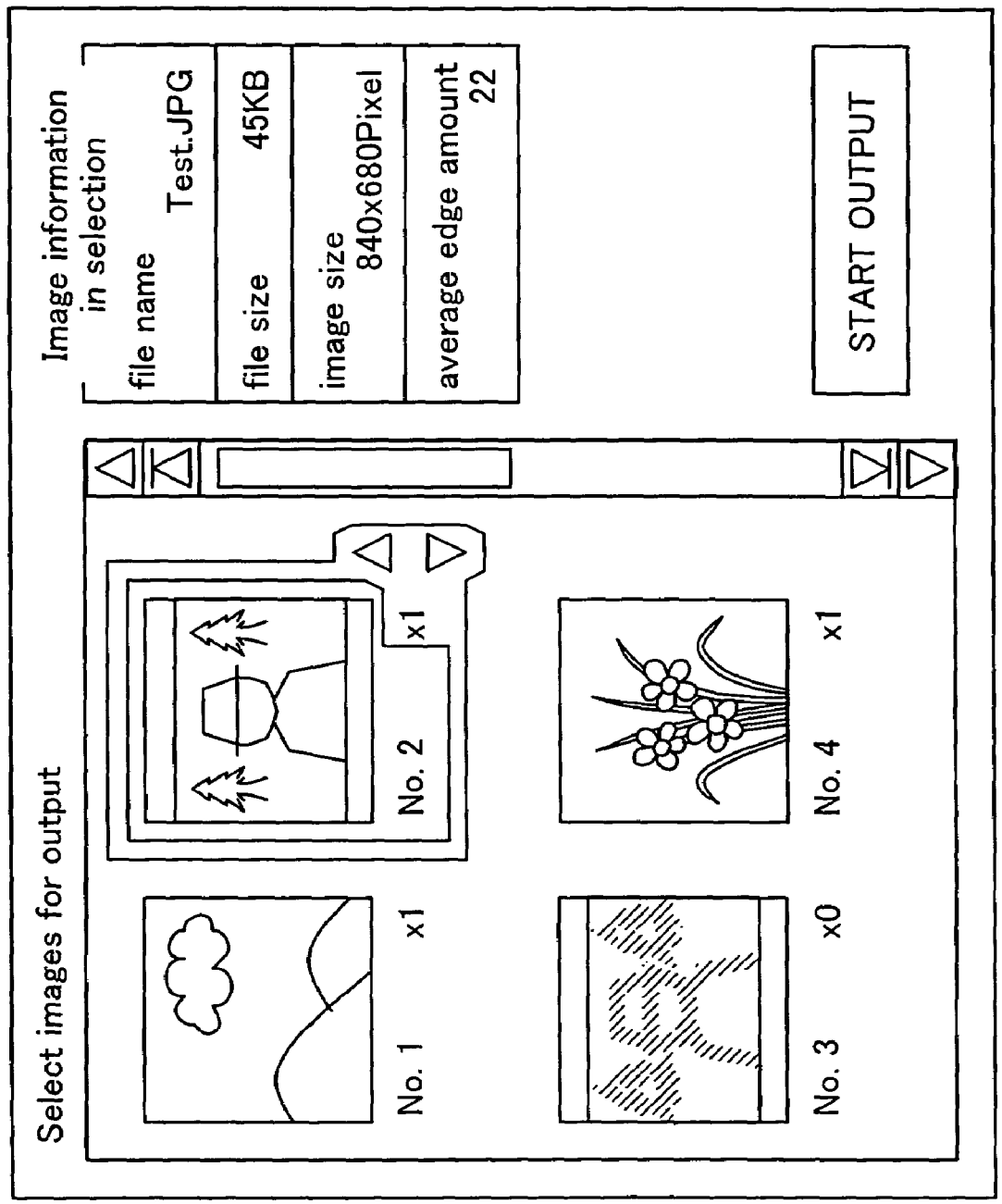
FIG. 14 illustrates confirming output target image data.

FIG. 14 illustrates confirming of output target images on monitor 14. The screen shown in FIG. 14 enables the user to confirm or modify output target images in the output target confirmation process illustrated in FIG. 10 (Step S104). As shown in the drawing, a list of images represented by a plurality of image files are shown on the screen. To the bottom left of each image is shown a number for identifying the image, and to the lower right of the image is shown a number for image outputs, shown to the right of an "x". For example, "x1" means that one copy of the image is to be output, and "x0" means that no copy of the image is to be output. The number for image output is set in Step S102 (FIG. 10), on the basis of the output target decision result recorded in RAM 151 (FIG. 6). In this embodiment, image data selected as an output target is set to "1", and image data to be excluded as an output target is set to "0". In the example in FIG. 14, the output number of the three sharp images, i.e. Nos. 1, 2, and 4, are set to 1, and the output number of the unsharp image, i.e. No. 3, is set to 0.

In the screen in FIG. 14, it is possible for the user to select any image and change the output number. The selected image is displayed with a border around the selected image. In the example in FIG. 14, image No. 2 has been selected. To the lower right of the border around the selected image are displayed arrows for changing the output number. By manipulating the arrows, the user is able to increase or decrease the output number. That is, by adjusting the output number, the user can modify output target image data. To the right of the screen in FIG. 14 is displayed information relating to the selected image. In this example, average edge amount, which is the image quality parameter used in the output target decision, is shown. The user can refer to this information while changing the output number of the image. In this example, an output number of 0 has been preset for blurry images, enabling the user to reduce the amount of effort needed to perform the operation of excluding blurry images as output targets.

In the screen in FIG. 14, when the user confirms output number and operates the Start Output button at the lower right of the screen, CPU 150 (FIG. 6) moves to the next step, which is the transfer process (FIG. 10: S106). In the transfer process, CPU 150 transfers image data depending on its output number (output target image data) to printer 20 which is the image output device. Printer 20 then outputs the images on the basis of the received image data.

Figure 15A:
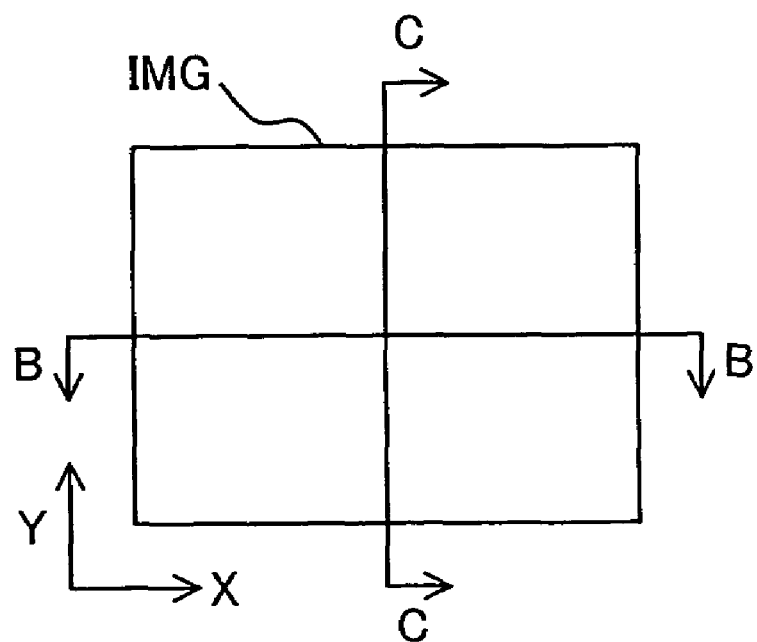
FIGS. 15(*a*)-15(*c*) illustrate a weight W distribution.
Figure 15C:
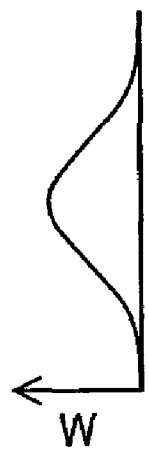
Figure 15B:

F2. Embodiment 2 of Image Selection Based on Sharpness Characteristic of an Image:

FIGS. 15(a)-15(c) illustrate a weight W distribution for use in calculating average edge amount in a second embodiment. FIG. 15(b) shows a weight W distribution taken along line B-B in the image IMG of FIG. 15(a) (X direction weight distribution); and FIG. 15(c) shows a weight W distribution taken along line C-C in the image IMG of FIG. 15(a) (Y direction weight distribution). In this embodiment, as shown in FIGS. 15(a)-15(c), a weighted average of edge amount is calculated using a weight W distribution that weights more heavily pixels closer to the center of image IMG, and the output target decision process is performed using this weighted average.

Figure 16A:
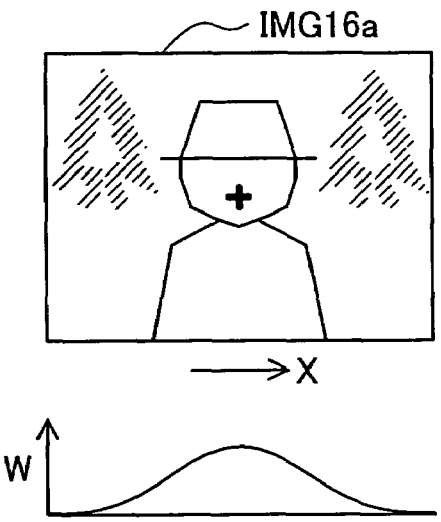
FIGS. 16(*a*)-16(*c*) illustrate a output target decision process in the second embodiment of image selection based on sharpness characteristics.
Figure 16A:
Figure 16B:
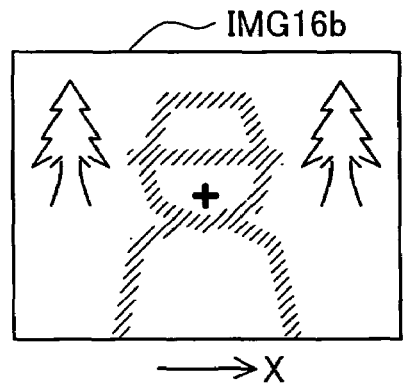
Figure 16B:
Figure 16C:
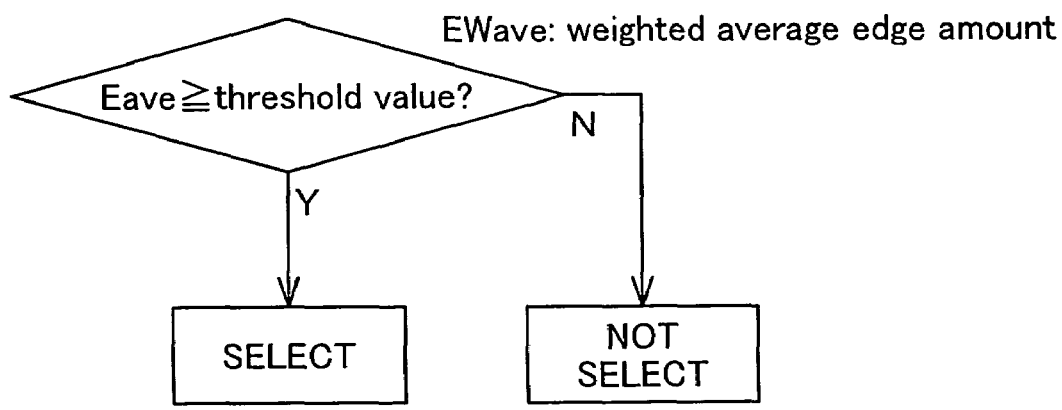

FIGS. 16(a)-16(c) illustrate the output target decision process in this embodiment. Two images, namely, IMG16a shown in FIG. 16(a) and IMG16b shown in FIG. 16(b), are images of a human figure at center with trees in the background. The cross mark in each image indicates the center of the image. In image IMG16a, the human figure at center is sharp, and the trees in the background are blurry. In image IMG16b, the human figure at center is blurry, and the trees in the background are sharp. Image data such as image IMG16b could be produced, for example, where the focus was on the background rather than the human subject at the time that the image data was generated.

Below each of the two images IMG16a and IMG16b is indicated an X direction distribution for weight W, shown in FIG. 15(b). The Y direction distributions for weight W are omitted from the drawing. Weighted average edge amounts obtained using such weights W are greater in images in which a subject situated in the center of the image is sharp, and smaller in images in which a subject situated in the center of the image is blurry, as in image IMG16b.

FIG. 16(c) shows the output target decision process of this embodiment. In this embodiment, image data whose weighted average edge amount EWave is equal to or greater than a threshold value is selected as an output target. Image data whose weighted average edge amount EWave is less than the threshold value is excluded as an output target. When image data is generated, in most instances, the desired subject is positioned at the image center. Thus, in this embodiment, image data in which a subject situated in proximity to the image center is sharp, for example, image data in which the desired subject is in focus, is selected as an output target, while image data in which a subject situated in proximity to the image center is blurred, for example, image data in which the desired subject is out of focus, is excluded as an output target.

The weight W distribution is deter mined such that heavier weights are assigned to an area that is desired to be sharper, as compared to the weight assigned to other areas. For example, weighted average edge amount may consist of an average value for edge amount in a certain predetermined area of an image. FIGS. 17(a)-17(c) illustrate a weight W distribution for calculating such a weighted average edge amount. In image IMG in FIG. 17(a), a predetermined area A1 is established. The magnitude of weight W is constant in this area A1, and is zero outside of this area A1. By so doing, image data in which a subject in proximity to the image center is blurry can be excluded from output images, regardless of data lying outside of area A1. Area A1 may consist, for example, of an area having the same shape as the original image, but smaller than the original image (20%, for example), and located in the center of the image. The magnitude of the weight in area A1 may be designed to be larger for pixels closer to the center of the image. By so doing, images in which an area in proximity to the image center in area A1 is blurry can be excluded from output images. It should be noted that, in this embodiment, the image quality parameter value (weighted average edge amount) is determined by analyzing the image data only, without utilizing image generation record information.

F3. Embodiment 3 of Image Selection Based on Sharpness Characteristic of an Image:

FIGS. 18(a)-18(c) illustrates a weight W distribution for use in calculating weighted average edge amount in a third embodiment. The difference from the example in FIGS. 15(a)-15(c) is that line B-B and line C-C pass through the center of the subject area, which is off the center of the image. In this embodiment, the image generation record information includes, as subject location information, subject area information (FIG. 5), and CPU 150 (FIG. 6) can acquire center coordinates for the subject area by analyzing the image generation record information. As shown in FIGS. 18(a)-18(c), weights W used for calculating weighted average edge amount are designed to be heavier in closer proximity to the center of the subject area.

FIGS. 19(a) and 19(b) illustrate the output target decision process in this embodiment. Two images, namely, IMG19a shown in FIG. 19(a) and IMG19b shown in FIG. 19(b), are images of a human figure at center with trees in the background. The difference from IMG16a and IMG16b shown in FIGS. 16(a) and 16(b) is that a center of a subject area is set within the image, and that a human subject is arranged not in the center of the image, but rather in proximity to the center of the subject area. The two images IMG19a and IMG19b each have a cross mark indicated at the center coordinate location of the subject area (FIG. 5) obtained by analyzing the image generation record information GI associated with the respective image data; a rectangular subject area is indicated as well.

Below each of the two images IMG19a and IMG19b is the weight W distribution in the X direction shown in FIG. 18(b). The Y axis distribution is not shown. Weighted average edge amount obtained using this weight W will be higher for an image that is sharp in proximity to the subject area, as shown by IMG19a, and lower for an image that is blurry in proximity to the subject area, as shown by IMG19b. In this embodiment, as with the output target decision process shown in FIG. 16(c), image data whose weighted average edge amount EWave is equal to or greater than a predetermined threshold value is selected as output target image data. Image data whose weighted average edge amount EWave is less than a predetermined threshold value is excluded as an output target. By so doing, images in which the subject is sharp in the subject area will be selected as output targets, while excluding blurry images as output targets.

The weight W distribution is determined such that heavier weights are assigned to an area that is desired to be sharper, as compared to the weight assigned to other areas. For example, weights may be assigned only in a certain predetermined area which center is situated at the center of the subject area. FIGS. 20(a)-20(c) illustrates such a weight W distribution. In image IMG in FIG. 20(a), a predetermined area A2 is established. The magnitude of weight W is constant in this area A2, and is zero outside of this area A2. By so doing, image data in which a subject in proximity to the center of the subject area is blurry can be excluded as an output image, regardless of data lying outside of area A2. Area A2 may consist, for example, of an area having the same aspect ratio as the original image, but smaller than the original image (20%, for example), and located in the center of the image. The magnitude of the weight in area A2 may be designed to be larger for pixels closer to the center of the subject area. FIGS. 21(a)-21(c) show an example of such weight W. The difference from FIGS. 20(a)-20(c) is that in area A2, magnitude of the weight W is larger closer to the center of the subject area. By so doing, images in which an area in proximity to the subject area center in area A2 is blurry can be excluded from output images Where subject area information includes not just center coordinates for a subject but also information relating to the outline of the subject area thereof, this subject area can be used as the predetermined area A2. By so doing, more appropriate output target decisions can be performed on subject area information included in image generation record information.

In this way, where image generation record information includes subject position information (subject area information), by determining an image quality parameter using a weighted distribution in which the area in proximity to the position of the subject is more heavily weighted, output target decisions can be performed more appropriately. It should be noted that, in this embodiment, the image quality parameter (weighted average edge amount) is determined by analyzing both image data and image generation record information.

Figures 22, 22A:
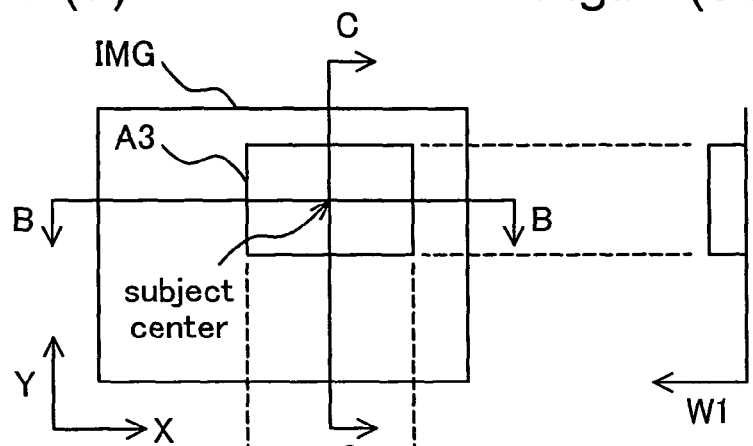
FIGS. 22(*a*), 22(*b*1), 22(*b*2), 22(*c*1), 22(*c*2), and 22(*d*) illustrate a output target decision process in the fourth embodiment of image selection based on sharpness characteristics.
Figure 22:
Figure 22:

F4. Embodiment 4 of Image Selection Based on Sharpness Characteristic of an Image:

FIGS. 22(a), 22(b1), 22(b2), 22(c1), 22(c2), and 22(d) illustrate the output target decision process of this embodiment. A difference from the embodiment shown in FIGS. 20(a)-20(c) is that the threshold value is not a predetermined value, but rather the average value of edge amount calculated using equal weight throughout the image. On the image IMG in FIG. 22(a) is provided a predetermined area A3 whose center is situated at the subject area center. FIGS. 22(b1) and 22(c1) illustrate a weight W1 distribution for calculating a weighted average edge amount as an image quality parameter. FIGS. 22(b2) and 22(c2) illustrate a weight W2 distribution used for calculating a threshold value. Weight W1 is constant within area A3, while outside of area A3 it is zero. Weight W2 is constant all over the image. Weighted average edge amount EWave calculated using the weight W1 represents a localized characteristic of sharpness in area A3, whereas threshold value Eth calculated using weight W2 represents a characteristic of sharpness of the overall image.

Figure 22D:
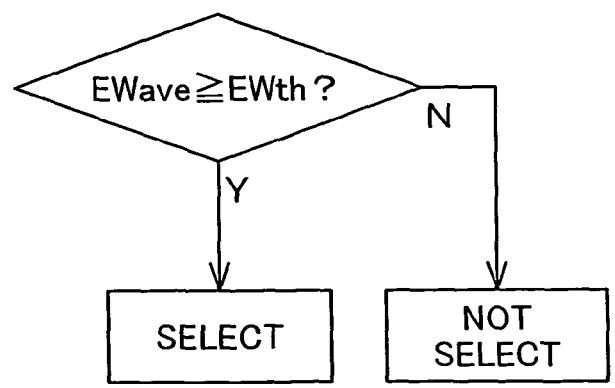

FIG. 22(d) shows the output target decision process in this embodiment. In this embodiment, image data whose average edge amount EWave obtained using the weight W1 distribution is equal to or greater than threshold value EWth calculated using weight W2 is selected as an output target. Image data whose weighted average edge amount EWave is less than threshold value EWth is excluded as an output target. That is, sharpness in a predetermined area is compared with sharpness of the image overall, and image data in which sharpness in the predetermined area is sharper, for example, image data in which a subject in proximity to the predetermined area is in focus, is selected as an output target, while image data in which sharpness in the predetermined area more blurry, for example, image data in which a subject in proximity to the predetermined area is out of focus, is excluded as an output target. The threshold value EWth in this embodiment assumes a different value for each image data, and is a value determined by sharpness of the overall image. Thus, the output target decision for image data generated under various conditions can be executed more appropriately for the particular image data.

The weight W1 distribution is determined such that heavier weights are assigned to an area that is desired to be sharper, as compared to the weights assigned to other areas. For example, the various weight W distributions in the embodiments described hereinabove can be used. As the weight W2 distribution used for calculating the threshold value Eth, a smaller weight may be used. By so doing, more images can be selected as output targets. Alternatively, a distribution in weight of an area desired to be sharper is smaller than weight in other areas may be used. By so doing, comparison of an area desired to be sharper with other areas can be performed more precisely. As a weight W2 distribution of this kind, a remainder distribution obtained by subtracting weight W1 from an equal distribution could be used.

F5. Variant Example of Image Selection Based on Sharpness Characteristic of an Image:

In the preceding embodiments, the average value of edge amount is used as a characteristic value relating to sharpness in an image, but various other values could be used. For example, the proportion of edge pixels to the total number of pixels could be used as a characteristic value relating to image sharpness. Here, "edge pixel" refers to a pixel having an edge amount that is greater than a predetermined edge threshold value. This edge threshold value may employ a value determined on the basis of a sensory test of image output results. For example, where the range of possible brightness values is 0-255, a value of 40 may be used as the predetermined edge threshold value. Edge pixels tend to be fewer in number in blurry images, and greater in number in sharp images. Thus, by selecting as output targets image data whose edge pixel proportion is equal to or greater than a threshold value, blurred images can be excluded from output targets. For example, the predetermined threshold value may be set to 20% of the total number of pixels. In this example, the image quality parameter (edge pixel proportion) is determined by analysis of image data only, without utilizing image generation record information.

As this edge pixel proportion, there may be used a weighted edge pixel proportion in which the number of pixels is counted using a weight distribution that assigns greater weight to areas intended to be sharper, in an manner analogous to calculating weighted average edge amount in the preceding embodiments. By so doing, decisions can be made placing greater emphasis on areas intended to be sharper. In such a case, the threshold value for deciding the magnitude of the weighted average edge amount may consist of a proportion of edge pixels calculated using equal weight throughout the image, or a proportion of edge pixels calculated using different weights depending on the location in the image, rather than a value predetermined in the manner of Embodiment 4 described hereinabove. Where weight distribution is set using subject position information included in image generation record information, the image quality parameter (edge pixel proportion) is determined by analyzing both the image data and the image generation record information.

G. Image Selection Based on Brightness Characteristic of an Image:

G1. Embodiment 1 of Image Selection Based on Brightness Characteristic of an Image:

FIGS. 23(a)-23(d) illustrate the output target decision process of this embodiment. The three images IMG23a-IMG23c shown in FIGS. 23(a) -(c) are images of a human figure. These images differ in brightness from one another. Image IMG23a has high brightness, image IMG23b has proper brightness, and image IMG23c has low brightness. In the high brightness image IMG23a, the brightness value of each pixel tends to be high, so average brightness value is large. In the low brightness image IMG23c, the brightness value of each pixel tends to be low, so average brightness value is small. When generating image data, the exposure is ordinarily adjusted so that the amount of light received by the image generating device is the proper amount. Where exposure deviates from the proper value, for example, where it is greater than the proper value, the amount of light received by the image generating device will be greater than the proper amount, so that bright image data similar to image IMG23a is produced. On the other hand, where the exposure is smaller than the proper value, the amount of light received by the image generating device will be less than the proper amount, so that bright image data similar to image IMG23c is produced.

FIG. 23(d) illustrates the output target decision process of this embodiment. In this embodiment, average brightness value Bave is used as the characteristic value relating to image brightness. Image data whose average brightness value Bave is within a predetermined proper range between a lower limit value Bth1 and an upper limit value Bth2 is selected as an output target. Image data whose average brightness value Bave is outside the predetermined proper range is excluded as an output target. By so doing, excessively bright image data and excessively dark image data can be excluded as output targets. A range determined through a sensory test of output results could be used as this proper range. For example, where the range of possible brightness values is 0-255, a predetermined proper range of 50 or above to less than 200 could be used. It should be noted that, in this embodiment, the image quality parameter (average brightness value) is determined by analysis of image data only, without utilizing image generation record information.

As the average brightness value, there may be used a weighted average brightness value calculated using a weight distribution that assigns greater weight to areas intended to have more proper brightness, in an manner analogous to calculating weighted average edge amount in the preceding embodiments. By so doing, decisions can be made placing greater emphasis on areas intended to be brighter. Where weight distribution is set using subject position information included in the image generation record information, the image quality parameter (average brightness value) is determined by analyzing both the image data and the image generation record information.

G2. Embodiment 2 of Image Selection Based on Brightness Characteristic of an Image:

FIGS. 24(a)-24(d) illustrate the output target decision process of this embodiment. The three images IMG24a-IMG24c shown in FIGS. 24(a)-(c) are images of a fruit. These images differ in brightness from one another. Image IMG24a has high brightness, image IMG24b has proper brightness, and image IMG24c has low brightness. In the high brightness image IMG24a, the brightness value of each pixel tends to be high, so the proportion of pixels whose brightness value is the maximum value within the range of possible brightness values tends to be high. The pixels having the maximum brightness value will be referred to as "clipping pixels" because their original pixel values, which could be more than maximum, were usually clipped to the maximum value. On the other hand, in the low brightness image IMG24c, the brightness value of each pixel tends to be low, so the proportion of pixels whose brightness value is the minimum value within the range of possible brightness values tends to be high. The pixels having the minimum brightness value will be also refereed to as "clipping pixels." In image IMG24a, the clipping area where brightness value at maximum value is indicated by vertical hatching. In image IMG24c, the clipping area where brightness value at minimum value is indicated by horizontal hatching. The number of clipping pixels is greater the greater the extent to which the quantity of light received by an image generating device at the time of image data generation deviates from the proper amount. For example, where the exposure during generation of image data is greater than the proper value, there tends to be produced an image containing a large number of clipping pixels whose brightness value is maximum value, as in image IMG24a. On the other hand, where the exposure is smaller the proper value, there tends to be produced an image containing a large number of clipping pixels whose brightness value is minimum value, as in image IMG24c.

FIG. 24(c) illustrates the output target decision process of this embodiment. In this embodiment, the proportion of clipping pixels Crate is used as a characteristic value relating to image brightness. Image data whose proportion of clipping pixels Crate is below a predetermined threshold value is selected as an output target. Image data whose proportion of clipping pixels Crate is above a predetermined threshold value is excluded as an output target. By so doing, excessively bright image data and excessively dark image data resulting, for example, from improper exposure setting at the time of generation of the image data, can be excluded as output targets. A value determined through responsive evaluation of image output results could be used as this predetermined threshold value. For example, the threshold value could be set to 10% of the total number of pixels. The proportion of clipping pixels whose brightness value is maximum value and the proportion of clipping pixels whose brightness value is minimum value can be evaluated separately; and threshold values for deciding the magnitude of each proportion can be mutually different values. By so doing, the output target decision process can be executed while taking into consideration differences between the effects on image quality of pixels whose brightness value is maximum value, and the effects on image quality of pixels whose brightness value is minimum value. Instead of the proportion of clipping pixels, the number of clipping pixels could be used as the characteristic value relating to image brightness. By so doing, a output target decision process that is not dependent on image size could be executed.

Figure 25A:
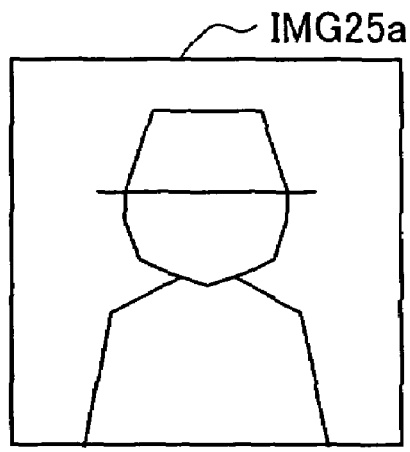
FIGS. 25(*a*)-25(*c*) illustrate a output target decision process in the first embodiment of image selection based on camera shake characteristics.
Figure 25B:
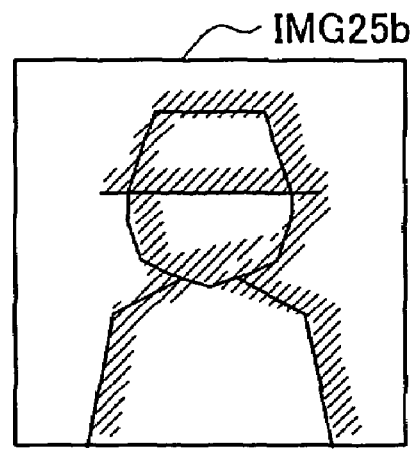
Figure 25C:
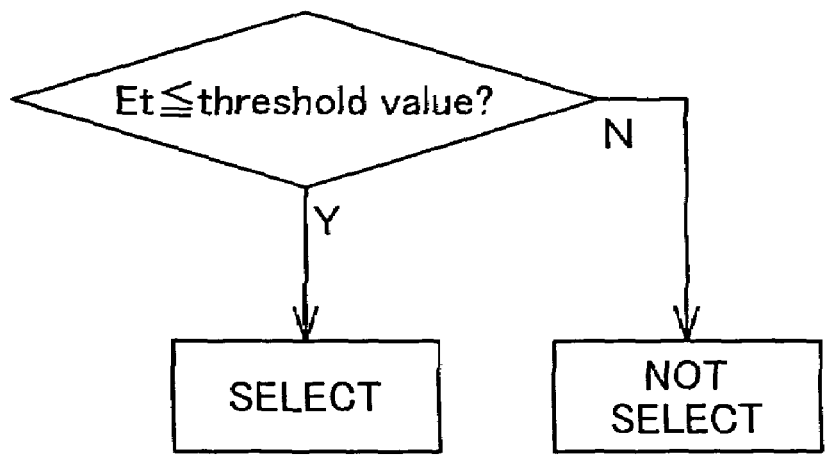

H. Image Selection Based on Camera Shake Characteristic of an Image:

H1. Embodiment 1 of Image Selection Based on Camera Shake Characteristic of an Image:

FIGS. 25(a)-25(c) illustrate the output target decision process of this embodiment. The two images IMG25a and IMG25b shown in FIGS. 25(a) and 25(b) are images of a human figure. The difference between these two images is that image IMG25a was generated with a relatively brief exposure time, whereas image IMG25b had a relatively long exposure time. In image IMG25a, the human figure is sharp. In image IMG25b, on the other hand, the human figure is blurred. When the orientation of the image generating device changes during the time that the image generating device is exposed to light, the position of the subject within the image changes, so that the resultant image is a blurred image. This blur is called camera shake, and is more likely to occur the longer the exposure time, so that an image that is blurred due to camera shake, like image IMG25b, is more likely to be produced the longer the exposure time.

FIG. 25(c) illustrates the output target decision process of this embodiment. In this embodiment, the exposure time Ef is used as a characteristic value relating to camera shake. The exposure time Ef can be acquired using exposure information included in the image generation record information GI (FIG. 3), or a parameter value for shutter speed information. Image data whose exposure time Ef is equal to or less than a predetermined threshold value is selected as an output target. Image data whose exposure time Ef exceeds a predetermined threshold value is excluded as an output target. The longer the exposure time Ef is, the more likely an image that is blurred due to camera shake will be produced. Accordingly, by excluding from output targets image data whose exposure time Ef exceeds a predetermined threshold value, output of images that are blurred due to camera shake can be reduced. A value determined through responsive evaluation of image output results could be used as this predetermined threshold value. For example, a threshold value of 1/15 second could be used. It should be noted that, in this embodiment, the image quality parameter (exposure time) is determined by analysis of image generation record information only, without utilizing image data.

Figure 26A:
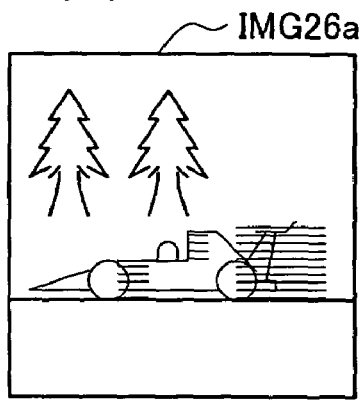
FIGS. 26(*a*)-26(*c*) illustrate a output target decision process in the second embodiment of image selection based on camera shake characteristics.
Figure 26B:
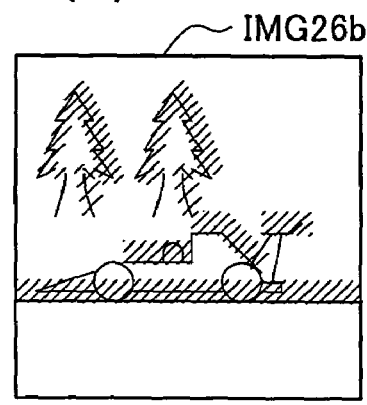
Figure 26C:
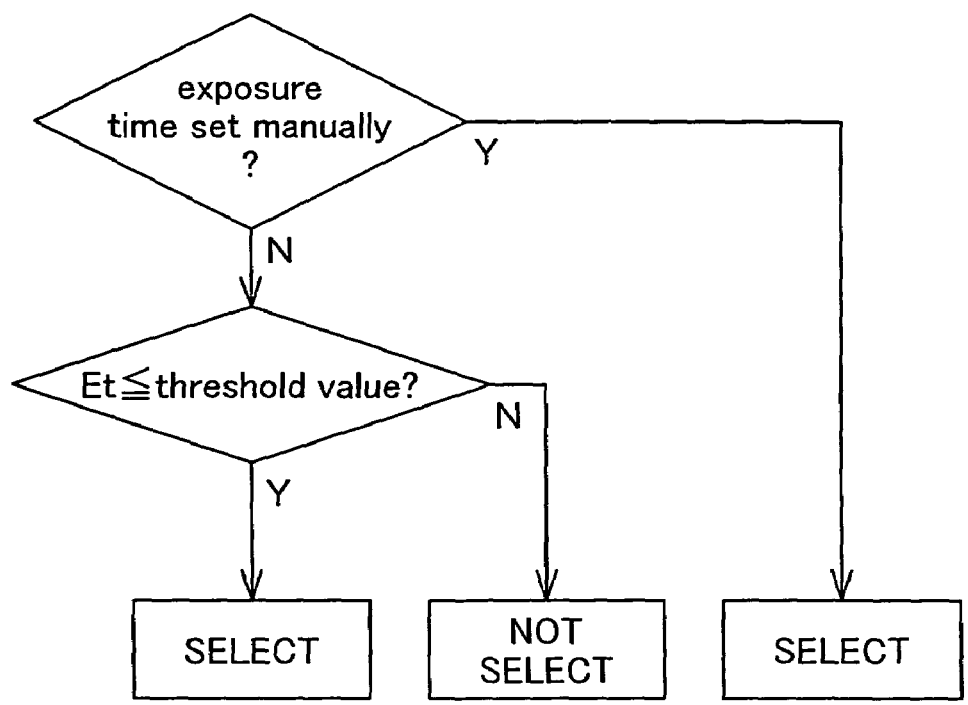

H2. Embodiment 2 of Image Selection Based on Camera Shake Characteristic of an Image:

FIGS. 26(a)-26c illustrate the output target decision process of this embodiment. The two images IMG26a and IMG26b shown in FIGS. 26(a) and 26(b) are images of a car against a background of trees. While these two images were both produced with a long exposure time of the image generating device at the time of image generation, image IMG26a shows an image produced with the time setting set manually and intentionally by user, whereas image IMG26b shows an image produced with the time setting set automatically. In image IMG26a, the trees in the background are not blurry, while the moving car appears blurred in the direction of travel. In image IMG26b, on the other hand, both the background trees and the car are blurred due to camera shake. Certain image generating devices allow the exposure time, for example, the shutter speed, to be set by the user. The user can deliberately set a slow shutter speed in order to produce an image that creates the impression of motion of a subject, or an image capturing a night scene with sufficient brightness. For example, to generate an image representing motion of a car by means of blurring, as in image IMG26a, a slow shutter speed would be intentionally used.

FIG. 26(c) illustrates the output target decision process of this embodiment. The difference from the example in FIG. 25(c) is that a decision based on the type of setting mode for the exposure time (shutter speed, for example) is added as a condition for image selection. In this embodiment, a decision as to whether the exposure time has been set by the user is executed using a parameter value for exposure program information (FIG. 5) obtained by analyzing the image generation record information GI. Exposure program information identifies an exposure adjustment mode defined by shutter speed and/or aperture value. Exposure adjustment mode in which shutter speed is set by the user could include, for example, shutter speed priority mode (parameter value: 4) and manual mode (parameter value: 1). Where the parameter value of exposure program information is 1 or 4, i.e., where shutter speed has been set manually by the user, the image data is selected as an output target regardless of exposure time Ef Where shutter speed has not been set manually, a decision process similar to the process shown in FIG. 25(c) is executed on the basis of exposure time Ef. By so doing, image data produced with the exposure time set by the user can be selected as an output target, regardless of the duration of exposure time. It should be noted that, in this embodiment, the image quality parameter (exposure time) is determined by analysis of image generation record information only, without utilizing image data.

Figure 27A:
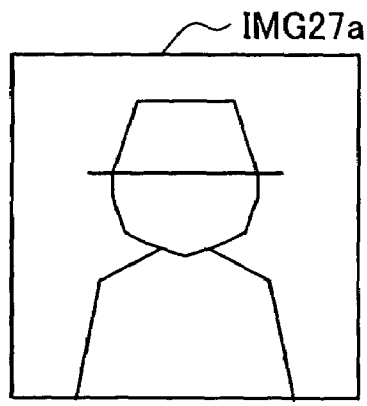
FIGS. 27(*a*)-27(*c*) illustrate a output target decision process in the third embodiment of image selection based on camera shake characteristics.
Figure 27B:
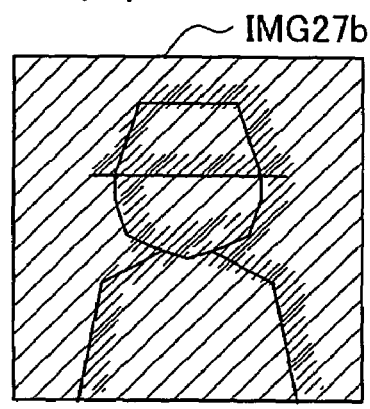
Figure 27C:
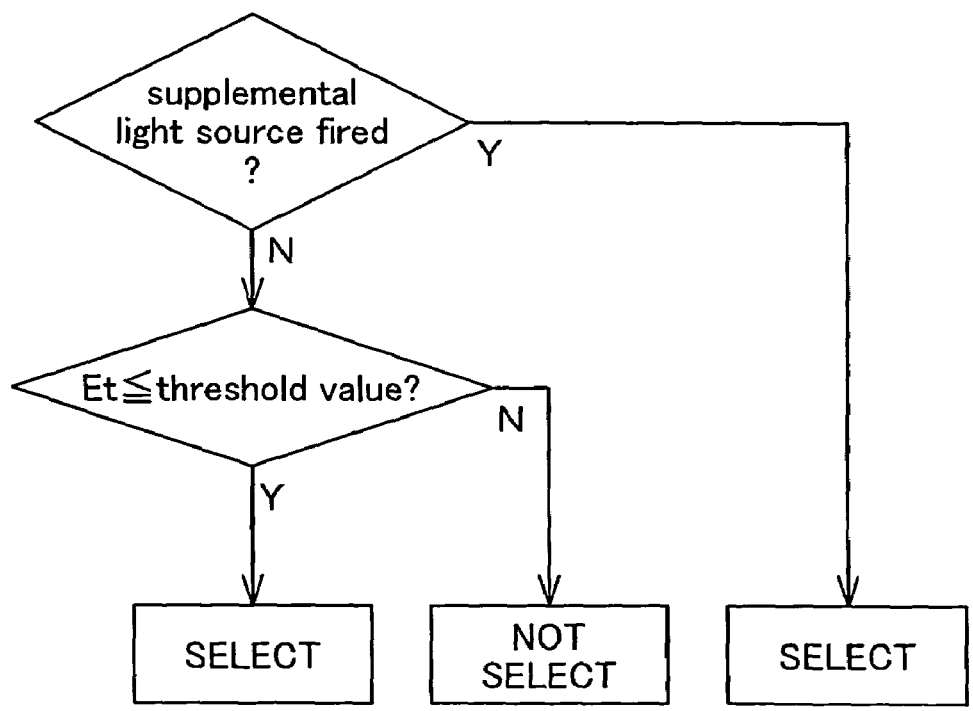

H3. Embodiment 3 of Image Selection Based on Camera Shake Characteristic of an Image:

FIGS. 27(a)-27(c) illustrate the output target decision process of this embodiment. The two images IMG27a and IMG27b shown in FIGS. 27(a) and 27(b) are images of a human figure. These two images are based on image data generated under low-light or dark conditions, and the exposure time is quite long. Image IMG27a shows an image produced with firing of a supplemental light source, such as a flash, whereas image IMG27b shows an image produced in the absence of a supplemental light source. In the image of image IMG17a, the human figure appears bright and sharp. In the image of image IMG17b, on the other hand, the human figure appears dark, and is blurred due to camera shake. When image data is generated under low-light conditions, the image generating device tends to set a longer exposure time in order to be able to let in more light. However, when image data is produced while firing a flash or other supplemental light source to illuminate a subject, the image generating device receives virtually all of the light during the flash time in which the flash is fired. That is, the exposure time will be substantially equal to the flash time, even where the image generating device has been set to a long exposure time. The flash time is extremely short, for example, 1/200 second or less. Thus, image data produced while firing a flash is not likely to be blurred due to camera shake.

FIG. 27(c) illustrates the output target decision process of this embodiment. The difference from the example in FIG. 25(c) is that a decision based on whether a supplemental light source has been fired is added as a condition for image selection. In this embodiment, a decision as to whether a supplemental light source has been fired is executed using a parameter value for flash information (FIG. 5) obtained by analyzing the image generation record information GI. Where the operation result in the flash information is Flash on, it may be decided that a supplemental light source has been fired. Further, in the event that a reflected light sensing mechanism is provided, and additionally reflected light is present, it can be decided that a supplemental light source has been fired. Where a decision result that a supplemental light source has been fired has been made by analyzing flash information, the image data is selected as an output target regardless of the exposure time Et. Where a decision result that a supplemental light source has been fired cannot be obtained, a decision process similar to the process shown in FIG. 25(c) is executed on the basis of exposure time Ef. By so doing, image data generated by firing a flash can be selected as an output target, even if the exposure time is quite long. In this embodiment, the image quality parameter (exposure time) is determined by analysis of image generation record information only, without utilizing image data.

Figure 28A:
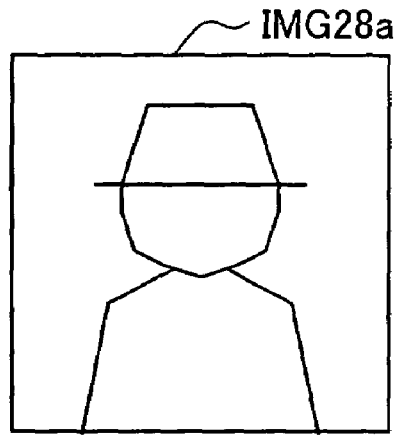
FIGS. 28(*a*)-28(*c*) illustrate a output target decision process in the fourth embodiment of image selection based on camera shake characteristics.
Figure 28B:
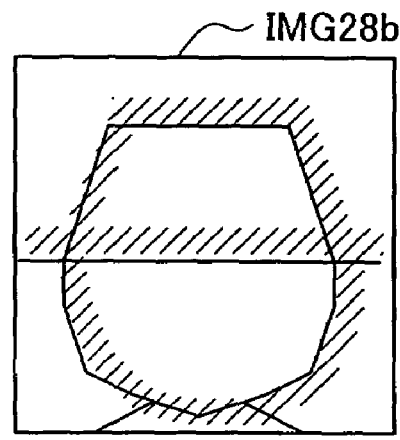
Figure 28C:
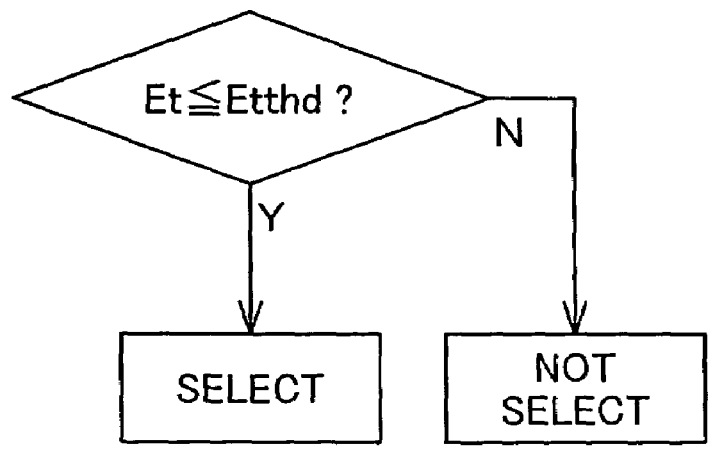
Figure 29:
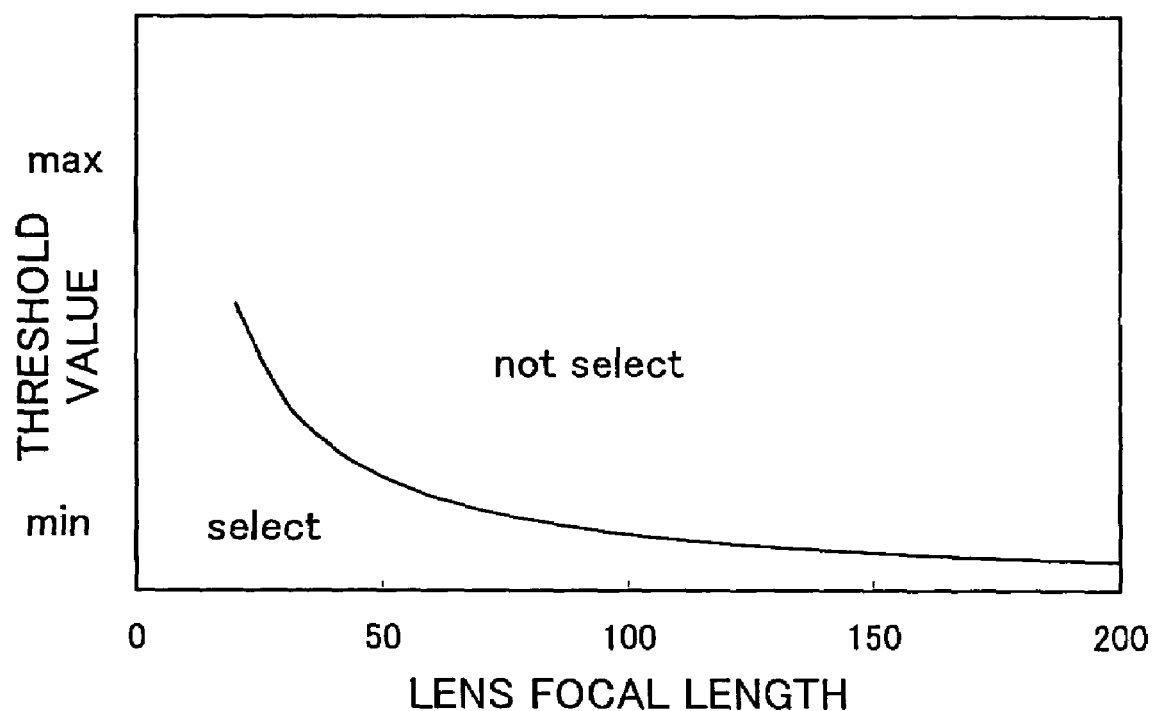
FIG. 29 illustrates the relationship between a threshold value and lens focal length.

H4. Embodiment 4 of Image Selection Based on Camera Shake Characteristic of an Image:

FIGS. 28(a)-28(c) illustrate the output target decision process of this embodiment. The two images IMG28a and IMG28b shown in FIGS. 28(a) and 28(b) are images of a human figure. Image IMG28a shows an image produced with a relatively short lens focal length, so that the human subject appears small and sharp. Image IMG28b, on the other hand, shows an image produced with a relatively longs lens focal length, so that the human subject appears large, and blurred due to camera shake. Lens focal length is a value that represents the distance between the center of the lens and its focal point, which is on the film or photoreceptor element such as a CCD. Longer focal length produces a larger image. Longer focal length also causes greater positional deviation of a subject in an image due to deviation in the orientation of the image generating device. That is, the longer the lens focal length and the greater the zoom of the image, the more susceptible the image will be to blurring due to camera shake, even where the exposure time is brief. On the other hand, the shorter the lens focal length and the smaller the zoom of the image, the less susceptible the image will be to blurring due to camera shake FIG. 28(c) illustrates the output target decision process of this embodiment. The difference from the example in FIG. 25(c) is that a threshold value Etthd for deciding the magnitude of the exposure time Et of the image generating device is set with reference to lens focal length. FIG. 29 is an illustration of the relationship between threshold value Etthd and lens focal length in this embodiment. Threshold value Etthd is designed to be inversely proportional to lens focal length. In this embodiment, the parameter value for lens focal length (converted to 35 mm film basis) information obtained by analyzing the image generation record information GI (FIG. 3) is used as the lens focal length. Using a threshold value set with reference to lens focal length, image data whose exposure time Et is equal to or less than threshold value Etthd is selected as an output target, so that the output target decision can be executed more appropriately on the basis of susceptibility to camera shake. This threshold value Etthd may also be designed to decrease in stepwise fashion over a plurality of steps in association with increase in lens focal length. By so doing, adjustment of threshold value Etthd can be accomplished by means of a simple process. Decisions as to the magnitude of exposure time Et using a threshold value set with reference to lens focal length can also be used in other embodiments wherein image selection is based on the aforementioned camera shake characteristics. It should be noted that, in this embodiment, the image quality parameter (exposure time) is determined by analysis of image generation record information only, without utilizing image data.

The parameter value for lens focal length (converted to 35 mm film basis) information is a value obtained by converting actual lens focal length to lens focal length in a camera that uses 35 mm, under conditions that maintain the ratio of photoreceptor element size to lens focal length. Image blur due to camera shake is more likely to occur at higher image zoom. Image zoom is a value that changes not only with lens focal length, but also with the ratio of lens focal length to photoreceptor element size or film size. Thus, susceptibility to camera shake must be decided upon using the ratio of lens focal length to photoreceptor element size or film size of the image generating device. The parameter value for lens focal length (converted to 35 mm film basis) information in this embodiment is a value that has been calculated in advance taking into account the size of the photoreceptor element. Thus, by determining a threshold value using the lens focal length converted to 35 mm film basis, a process for adjusting threshold value on the basis of different film or photoreceptor element size in different image generating devices can be dispensed with.

Figure 30:
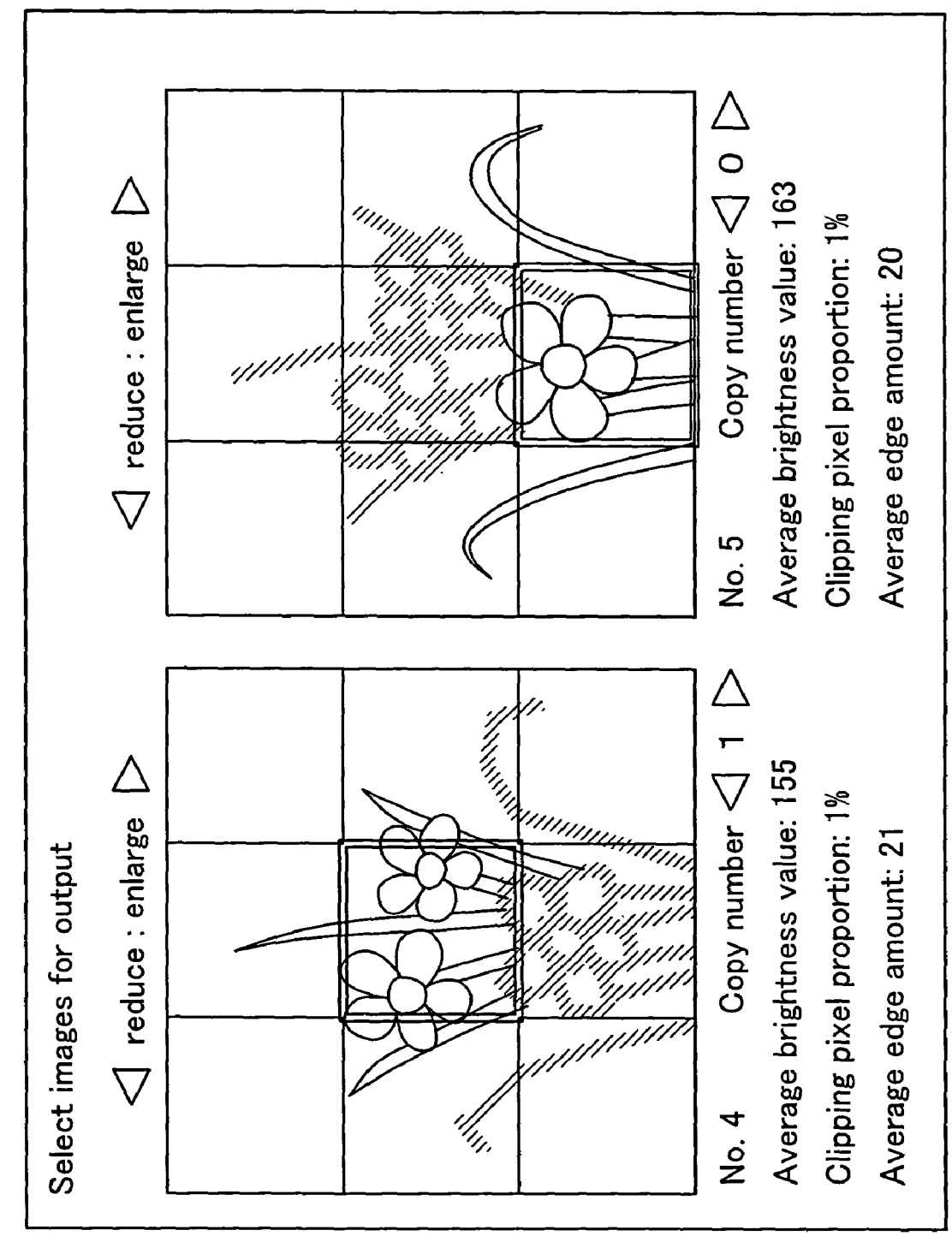
FIG. 30 illustrates another example showing an user interface for confirmation of output target image data.

I. Example Arrangement of Another Output Target Confirmation Process:

FIG. 30 is an illustration of another example showing confirmation of output target image data on monitor 14. The screen shown in FIG. 30 is a screen for the user to confirm or modify output target image data in the output target confirmation process of Step S104 in FIG. 10. Two images of flowers are shown on the screen. The difference from the embodiment illustrated in FIG. 14 lies in that the displayed images are divided into a plurality of areas, shown with the areas having the highest proportion of edge pixels highlighted by double lines. The image at left on the screen is an image in which the flowers in the center of the image are in focus; the image at right is an image in which the flower at the bottom of the image is in focus. By confirming the area that is highlighted on the basis of the number of edge pixels, the user can readily identify which subject in the image is in focus. That is, output target image data can be readily confirmed or modified based on focus condition. At the bottom of each image are displayed a number of image quality parameters for use in the output target decision. Referring to this information, the user can more appropriately confirm or modify output target image data.

Highlighted area in each image can be selected on the basis of various characteristics other than the proportion of edge pixels. For example, areas having the highest proportion of clipping pixels may be shown highlighted. By so doing, the user can readily confirm whether large numbers of clipping pixels are present in proximity to a desired subject. The method of dividing images may be a predetermined method, for example, a method of dividing an image into nine areas as shown in FIG. 30, or be designed so that the user can indicate the division method.

Highlighted areas may be displayed by processing pixel data that have a predetermined characteristic. For example, color of edge pixels may be changed to red in order to highlight them. Pixels having another characteristic, for example, clipping pixels, may likewise be highlighted by changing the pixel color. By so doing, the user can readily confirm the distribution and quantity of pixels having a predetermined characteristic within an image, thus further facilitating confirmation and modification of output target image data.

Figure 31:
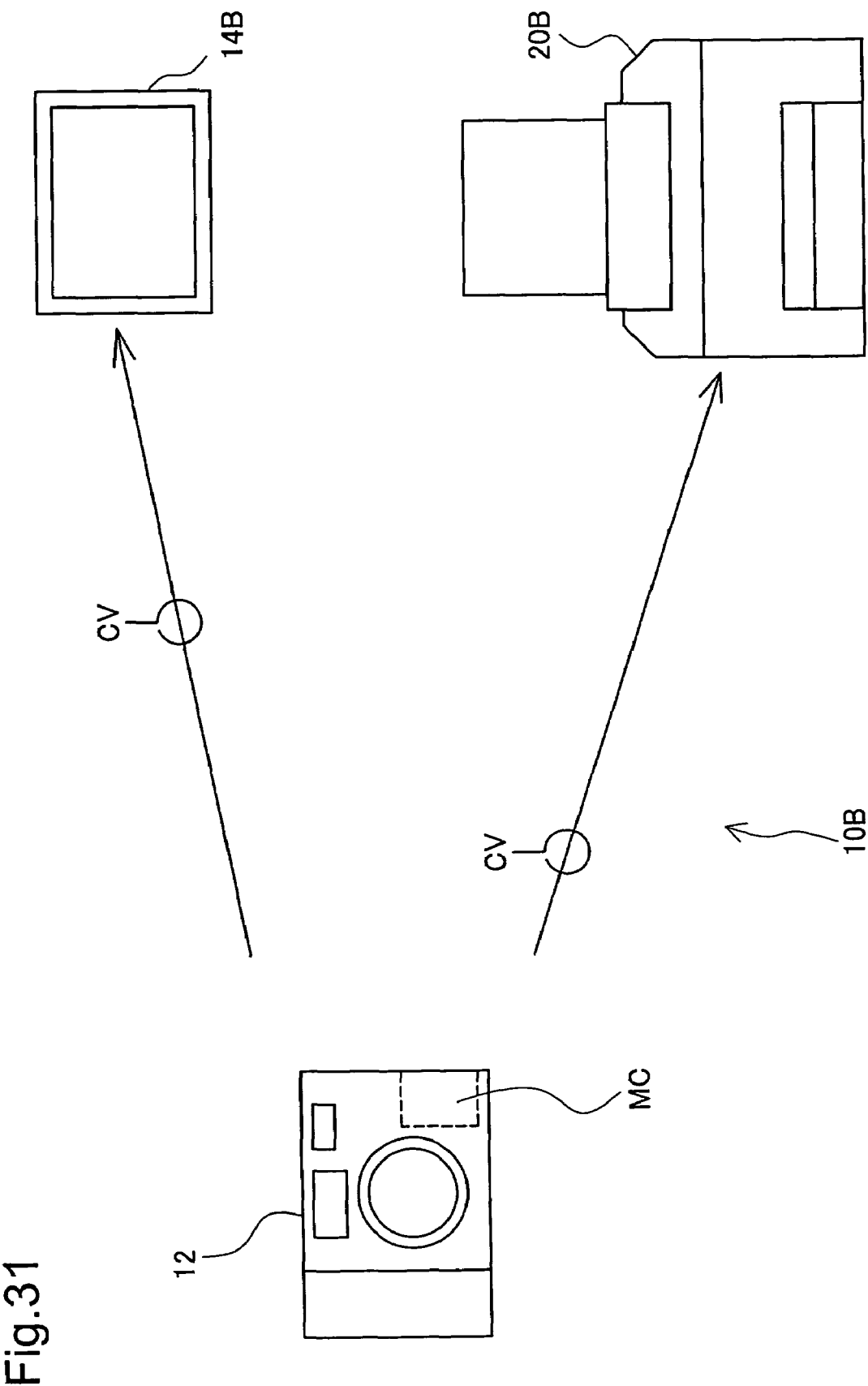
FIG. 31 illustrates another example of an output system as an embodiment of the invention.

J. Arrangement of Another Image Output System:

FIG. 31 illustrates another example of an output system by way of an embodiment of the present invention. Image output system 10B comprises a digital still camera 12 as an image generating device for generating image files; and a printer 20B as an image output device. As the image output device, a CRT display, LCD display, or other monitor 14B, or a projector could be used instead of printer 20B. In the following description, it is assumed that printer 20B is used as the image output device. This embodiment differs from the output system embodiment described previously (FIG. 1) in that the printer 20B serving as the output device has, in addition to an output section for outputting images, a judging section and a selector for performing output target decisions.

An image file created in digital still camera 12 is transferred to printer 20B via a cable CV, or by directly inserting into printer 20B a memory card MC having the image file stored thereon. Printer 20B executes the aforementioned image data processing (FIG. 10) using the read out image file, and outputs images based on image data that has been selected as output targets.

The arrangement of printer 20B in this embodiment may be similar to the arrangement of printer 20 (FIG. 7, FIG. 8) in the embodiment described previously. In this embodiment, the control circuit 30 (FIG. 8) executes image data processing (FIG. 10) in addition to the image output process. CPU 31 of control circuit 30 executes image data processing; RAM 33 temporarily stores operation results from CPU 31, and image data; and PROM 32 stores data needed for image data processing, such as an output target decision program. That is, CPU 31, RAM 33, and PROM 32 function as a judging section and a selector. A memory card slot 34 (FIG. 8) acquires data from an installed memory card MC.

An image file GF generated by a digital still camera 12 is transferred to printer 20B via a cable or via a memory card MC. When CPU 31 receives an image file GF, it executes the image data processing routine (FIG. 10) described previously.

CPU 31 reads out the received image file (Step S100) and executes an output target decision process (Step S102). After recording the output target decision result in RAM 33, CPU 31 executes an output target confirmation process (Step S104). In the output target confirmation process, the user can confirm or modify output target image data through control panel 29. Where control panel 29 does not have size sufficient to display the screen shown in FIG. 14 or FIG. 30, control panel 29 may instead be designed to display number and/or file name identifying the image data, and the number of copies of each image, so that the user can modify the number of copies. Once the user has completed modification/confirmation, CPU 31 outputs images based on the output target image data. In this embodiment, an image output process is executed instead of the image data output process (Step S106).

In this embodiment, printer 20B is furnished with a judging section and a selector, so the output target image data selection process can be executed automatically, without using an image data processing device such as a computer PC.

As described in the embodiments hereinabove, the output target decision process is executed automatically, so that the effort by the user entailed in selecting output targets may be reduced. Since the output target decision can be made using various different conditions, more appropriate output target decisions can be made.

K. Variant Examples

The present invention is not limited to the embodiments set forth hereinabove, and may be reduced to practice in various modes without departing from the scope and spirit thereof, the following variations are possible.

K1. Variant Example 1

The output target decision process in the embodiments hereinabove may be executed by making decisions based on a plurality of decision conditions, and the decision results combined appropriately using logical sum or logical product functions to determine a final decision result. For example, in one possible arrangement, a decision is made regarding camera shake; image data for which the decision result has been to exclude it as an output target is subject to an additional decision on the basis of average value of edge amount; and only if the second decision result for this image data has been to exclude it as an output target, is it then excluded as an output target. By so doing, output target decisions can be made more appropriately. The method for combining a plurality of decision results on the basis of plurality of decision conditions in order to determine a final decision result may be determined on the basis of sensory test of image output results.

K2. Variant Example 2

An arrangement is also possible wherein decision conditions used in output target decisions are determined depending on information included in image generation record information GI. For example, where image generation record information GI includes shutter speed information, flash information, and exposure program information, image data for which Flash On or exposure time has been set manually may be selected as an output target independently of exposure time, while still executing output target decisions for other image data on the basis of exposure time. Where image generation record information GI includes shutter speed information or exposure time information, a final decision result may be determined using a decision relating to camera shake and a decision based on the proportion of edge pixels; or where shutter speed information and exposure time information are not included, a final decision result may be determined a decision based on the proportion of edge pixels only. By so doing, it is possible to make output target decisions that effectively utilize information included in image generation record information GI.

K3. Variant Example 3

The output target confirmation process (Step S104 in FIG. 10) may be omitted from the embodiments hereinabove. In this case, images based on output target image data selected automatically by the selector will by output by the output section. By so doing, image output can be executed without the user having to select whether images should be output targets.

K4. Variant Example 4

In the embodiments hereinabove, an arrangement wherein the image generating device comprises an analyzer and selector for performing output target decisions is also possible. For example, the control circuit 124 of the image generating device, namely, digital still camera 12 (FIG. 2), may function as an analyzer and selector for performing output target decisions. Control circuit 124 will execute the image data processing described above (FIG. 10) using a generated image file GF. In the output target confirmation process (Step S104), the user can confirm or modify output target image data via the liquid crystal display 127 and Set button 126. Once the user has finished modifying/confirming, control circuit 124 stores the output target image data on memory card MC. In this variant example, a process to store image data on memory card MC is executed instead of the image data transfer process (Step S106). Output target image data stored on memory card MC may then be transferred to a printer or other output device via a cable, or via the memory card MC. In cases where additional image data processing is to be performed on output target image data, an arrangement wherein the output target image data is transferred to a computer or other image data processing device is acceptable. In this variant example, digital still camera 12 functions both as an image generating device, and as an image data processing device comprising an analyzer and selector for performing output target decisions.

K5. Variant Example 5

In the embodiments hereinabove, an arrangement whereby picture quality adjustment processing is performed prior to executing output target decisions is also possible. For example, a sharpness adjustment process to adjust image sharpness to an appropriate value, or a color balance adjustment process to adjust image color balance (e.g., RGB color balance) to appropriate values may be used. By so doing, image data whose picture quality has been improved through picture quality adjustment processing may be selected as output targets. An arrangement whereby picture quality adjustment processing is performed subsequent to output target decisions is also acceptable. By so doing, images having improved picture quality can be output.

K6. Variant Example 6

In the preceding embodiments, an Exif format file was described by way of specific example of the image file GF, but the format of the image file pertaining to the present invention is not limited to this. That is, any image file containing image data generated by an image data generating device, and image generation record information GI describing conditions at the time of generation of the image data is acceptable. Using such a file, appropriate output target decisions may be made based at least on either image generation record information GI or image data GD.

K7. Variant Example 7

In the preceding embodiments, a digital still camera 12 was described as the image generating device, but image files could be generated using a different image data generating device, such as a scanner, and digital video camera.

K8. Variant Example 8

In the preceding embodiments, there is described a case wherein image data GD and image generation record information GI are contained in the same image file GF; however, image data GD and image generation record information GI need not necessarily be stored within the same file. That is, it is sufficient for image data GD and image generation record information GI to be associated with each other; for example, it would be acceptable to generate associating data that associates image data GD with image generation record information GI; store one or several sets of image data and image generation record information GI in independent files; and refer to the associated image generation record information GI when processing the image data GD. This is because, in this case, although the image data GD and image generation record information GI are stored in separate files, at the point in time of image processing which utilizes image generation record information GI, the image data GD and image generation record information GI are in inseparably linked, and thus function substantially the same as if they were stored in the same file. That is, the term image file GF in the present embodiment includes those of a form wherein image data GD and image generation record information GI are associated, at least at the point in time that image processing takes place. Also included are motion video files stored on optical disk media such as CD-ROM, CD-R, DVD-ROM, and DVD-RAM.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for selecting an image and transferring the selected image to an image output section that outputs the selected image according to image data generated by an image generating device and image generation record information associated with the image data, the image generation record information including at least operation information of the image generating device at the time that the image data is generated, the image processing device comprising:

an analyzer configured to analyze both the image data and the image generation record information associated with the image data to determine an image quality parameter relating to quality of an image represented by the image data; and a selector configured to perform, on the basis of the image quality parameter, an output target decision regarding whether to select the image data as an output target, wherein the analyzer calculates an edge amount at each pixel position in the image, and determines as the image quality parameter a first average value of the edge amounts weighted by a first weight distribution assigned to an area of the image, the first weight distribution is determined independently from the edge amounts, the area includes a subject location in the image, the subject location being recorded in the image generation record information, and the area has a same aspect ratio as the image and is smaller than the image, a first weight in the first weight distribution is constant throughout the area, and the first weight is zero outside of the area, the first weight in the area is the same as a weight on a boundary between the area and an other area of the image, the other area of the image being different from the area, the selector selects as the output target the image data having an image quality parameter that is equal to or greater than a threshold value, the threshold value being a second average value of edge amounts calculated using a second weight, the second weight is constant throughout the image regardless of whether the second weight is inside the area, outside of the area, or on the boundary between the area and the other area, and the selector does not select as the output target the image data having an image quality parameter that is less than the threshold value.

2. An image processing device according to claim 1 wherein the analyzer determines a first characteristic value of the quality characteristic parameter that indicates a characteristic relating to sharpness of the image, and the selector performs the output target decision on the basis of the first characteristic value.

3. An image processing device according to claim 2 wherein the image generation record information includes subject location information for the image, and the analyzer determines the first characteristic value using the subject location information.

4. An image output device for outputting an image according to image data generated by an image generating device and image generation record information associated with the image data, the image generation record information including at least operation information of the image generating device at the time that the image data is generated, the image output device comprises:

an analyzer configured to analyze both the image data and the image generation record information associated with the image data to determine an image quality parameter relating to quality of an image represented by the image data;

a selector configured to perform, on the basis of the image quality parameter, an output target decision regarding whether to select the image data as an output target; and an output section configured to output an image using the image data that has been selected as the output target by the selector, wherein the analyzer calculates an edge amount at each pixel position in the image, and determines as the image quality parameter a first average value of the edge amounts weighted by a first weight distribution assigned to an area of the image, the first weight distribution is determined independently from the edge amounts, the area includes a subject location in the image, the subject location being recorded in the image generation record information, and the area has a same aspect ratio as the image and is smaller than the image, a first weight in the first weight distribution is constant throughout the area, and the first weight is zero outside of the area, the first weight in the area is the same as a weight on a boundary between the area and an other area of the image, the other area of the image being different from the area, the selector selects as the output target the image data having an image quality parameter that is equal to or greater than a threshold value, the threshold value being a second average value of edge amounts calculated using a second weight, the second weight is constant throughout the image regardless of whether the second weight is inside the area, outside of the area, or on the boundary between the area and the other area, and the selector does not select as the output target the image data having an image quality parameter that is less than the threshold value.

5. A method of selecting an image and transferring the selected image to an image output section that outputs the selected image according to image data generated by an image generating device and image generation record information associated with the image data, the image generation record information including at least operation information of the image generating device at the time that the image data is generated, the method comprising:

analyzing both the image data and the image generation record information associated with the image data to determine an image quality parameter relating to quality of an image represented by the image data; and performing, on the basis of the image quality parameter, an output target decision regarding whether to select the image data as an output target, wherein the analyzing of the image data and the image generation record information includes calculating an edge amount at each pixel position in the image, and determining as the image quality parameter a first average value of the edge amounts weighted by a first weight distribution assigned to an area of the image, the first weight distribution is determined independently from the edge amounts, the area includes a subject location in the image, the subject location being recorded in the image generation record information, and the area has a same aspect ratio as the image and is smaller than the image, a first weight in the first weight distribution is constant throughout the area, and the first weight is zero outside of the area, the first weight in the area is the same as a weight on a boundary between the area and an other area of the image, the other area of the image being different from the area, the performing of the output target decision includes selecting as the output target the image data having an image quality parameter that is equal to or greater than a threshold value, the threshold value being a second average value of edge amounts calculated using a second weight, the second weight is constant throughout the image regardless of whether the second weight is inside the area, outside of the area, or on the boundary between the area and the other area, and the performing of the output target decision includes not selecting as the output target the image data having an image quality parameter that is less than the threshold value.

6. A method according to claim 5 wherein the analyzing of the image data and the image generation record information includes determining a first characteristic value of the quality characteristic parameter that indicates a characteristic relating to sharpness of the image, and the performing of the output target decision includes performing the output target decision on the basis of the first characteristic value.

7. A method according to claim 6 wherein the image generation record information includes subject location information for the image, and the analyzing of the image data and the image generation record information includes determining the first characteristic value using the subject location information.

8. A method of outputting an image according to image data generated by an image generating device and image generation record information associated with the image data, the image generation record information including at least operation information of the image generating device at the time that the image data is generated, the method comprising:

analyzing both the image data and the image generation record information associated with the image data to determine an image quality parameter relating to quality of an image represented by the image data;

performing, on the basis of the image quality parameter, an output target decision regarding whether to select the image data as an output target; and outputting an image using the image data that has been selected as the output target by the selector, wherein the analyzing of the image data and the image generation record information includes calculating an edge amount at each pixel position in the image, and determining as the image quality parameter a first average value of the edge amounts weighted by a first weight distribution assigned to an area of the image, the first weight distribution is determined independently from the edge amounts, the area includes a subject location in the image, the subject location being recorded in the image generation record information, and the area has a same aspect ratio as the image and is smaller than the image, a first weight in the first weight distribution is constant throughout the area, and the first weight is zero outside of the area, the first weight in the area is the same as a weight on a boundary between the area and an other area of the image, the other area of the image being different from the area, the performing of the output target decision includes selecting as the output target the image data having an image quality parameter that is equal to or greater than a threshold value, the threshold value being a second average value of edge amounts calculated using a second weight, the second weight is constant throughout the image regardless of whether the second weight is inside the area, outside of the area, or on the boundary between the area and the other area, and the performing of the output target decision includes not selecting as the output target the image data having an image quality parameter that is less than the threshold value.

9. A computer program product comprising:

a computer-readable storage medium; and a computer program stored on the computer-readable storage medium, the computer program including a first program for causing a computer to analyze both an image data and an image generation record information associated with the image data to determine an image quality parameter relating to quality of an image represented by the image data; and a second program for causing the computer to perform, on the basis of the image quality parameter, an output target decision regarding whether to select the image data as an output target, wherein the first program includes a program for causing the computer to calculate an edge amount at each pixel position in the image, and to determine as the image quality parameter a first average value of the edge amounts weighted by a first weight distribution assigned to an area of the image, the first weight distribution is determined independently from the edge amounts, the area includes a subject location in the image, the subject location being recorded in the image generation record information, and the area has a same aspect ratio as the image and is smaller than the image, a first weight in the first weight distribution is constant throughout the area, and the first weight is zero outside of the area, the first weight in the area is the same as a weight on a boundary between the area and an other area of the image, the other area of the image being different from the area, the second program includes a program for causing the computer to select as the output target the image data having an image quality parameter that is equal to or greater than a threshold value, the threshold value being a second average value of edge amounts calculated using a second weight, the second weight is constant throughout the image regardless of whether the second weight is inside the area, outside of the area, or on the boundary between the area and the other area, and the second program includes a program for causing the computer not to select as the output target the image data having an image quality parameter that is less than the threshold value.

* * * * *